(12) United States Patent
Pearson et al.

(10) Patent No.: US 11,670,955 B2
(45) Date of Patent: Jun. 6, 2023

(54) INTEGRATED POWER MODULE DEVICES, SYSTEMS, AND METHODS

(71) Applicant: Roccor, LLC, Longmont, CO (US)

(72) Inventors: Chris Pearson, Boulder, CO (US); Steven Isaacs, Loveland, CO (US); William Francis, Lyons, CO (US)

(73) Assignee: ROCCOR, LLC, Longmont, CO (US)

( * ) Notice: Subject to any disclaimer, the term of this patent is extended or adjusted under 35 U.S.C. 154(b) by 408 days.

(21) Appl. No.: 16/679,644

(22) Filed: Nov. 11, 2019

(65) Prior Publication Data

US 2020/0185957 A1  Jun. 11, 2020

Related U.S. Application Data

(63) Continuation of application No. PCT/US2018/032231, filed on May 11, 2018.

(51) Int. Cl.
*H02J 7/35* (2006.01)
*H02S 40/38* (2014.01)
(Continued)

(52) U.S. Cl.
CPC ............ *H02J 7/35* (2013.01); *B64G 1/425* (2013.01); *B64G 1/428* (2013.01); *B64G 1/443* (2013.01);
(Continued)

(58) Field of Classification Search
CPC .......... H02J 7/35; H02J 7/0068; H02S 40/38; H02S 40/44; H02S 30/20; B64G 1/425; B64G 1/428; G64G 1/443
See application file for complete search history.

(56) References Cited

U.S. PATENT DOCUMENTS

| 3,372,737 A | 3/1968 | Schnell |
| 4,209,346 A | 6/1980 | King |
(Continued)

FOREIGN PATENT DOCUMENTS

| EP | 2343241 | 7/2011 |
| WO | WO 2017/195289 | 11/2017 |
| WO | WO 2018/209185 | 11/2018 |

OTHER PUBLICATIONS

First Examination Report, European Appl. No. 18798475.2, dated Apr. 8, 2022, EPO.
(Continued)

*Primary Examiner* — Carlos Amaya
(74) *Attorney, Agent, or Firm* — Terry M. Banks. Esq.; Beusse Sanks, PLLC

(57) ABSTRACT

Integrated power module device, systems, and methods are provided in accordance with various embodiments. For example, some embodiments include a system that may include one or more integrated power modules. Each integrated power module may include: one or more solar cells; one or more rechargeable energy storage cells; and/or one or more circuits coupling the one or more solar cells with the one or more rechargeable energy storage cells. In some embodiments, each integrated power module is configured such that the one or more rechargeable energy storage cells of the respective integrated power module are coupled with one or more back sides of the one or more solar cells. In some embodiments, at least two of the one or more integrated power modules are coupled with each other at least in parallel or in series.

26 Claims, 21 Drawing Sheets

Related U.S. Application Data

(60) Provisional application No. 62/504,832, filed on May 11, 2017.

(51) Int. Cl.
- *H02S 40/44* (2014.01)
- *B64G 1/42* (2006.01)
- *B64G 1/44* (2006.01)
- *H02J 7/00* (2006.01)
- *H02S 30/20* (2014.01)

(52) U.S. Cl.
CPC ............ *H02J 7/0068* (2013.01); *H02S 40/38* (2014.12); *H02S 40/44* (2014.12); *H02S 30/20* (2014.12)

(56) References Cited

U.S. PATENT DOCUMENTS

| | | |
|---|---|---|
| 4,481,265 A | 11/1984 | Ezawa |
| 7,967,256 B2 * | 6/2011 | Wong .................... B64G 1/506 244/171.8 |
| 8,324,857 B1 | 12/2012 | Chang |
| 9,120,583 B1 | 9/2015 | Spence |
| 9,166,424 B2 | 10/2015 | Oakley |
| 9,368,983 B2 * | 6/2016 | Stickelmaier ......... H02J 7/0031 |
| 2003/0038610 A1 * | 2/2003 | Munshi .................... H02J 7/35 320/101 |
| 2005/0230558 A1 | 10/2005 | Nakasuka |
| 2007/0063105 A1 | 3/2007 | Mann |
| 2013/0263441 A1 | 10/2013 | Boncyk |
| 2020/0366237 A1 | 11/2020 | Hernandez |
| 2021/0218468 A1 | 7/2021 | Avellan |
| 2021/0258068 A1 | 8/2021 | Halperin |

OTHER PUBLICATIONS

International Search Report and Written Opinion, Int'l Appl. No. PCT/US2018/032231, dated Sep. 20, 2018, ISA-USPTO.

Extended European Search Report and Search Opinion, European Appl. No. 18798475.2, dated Jan. 13, 2021, EPO.

* cited by examiner

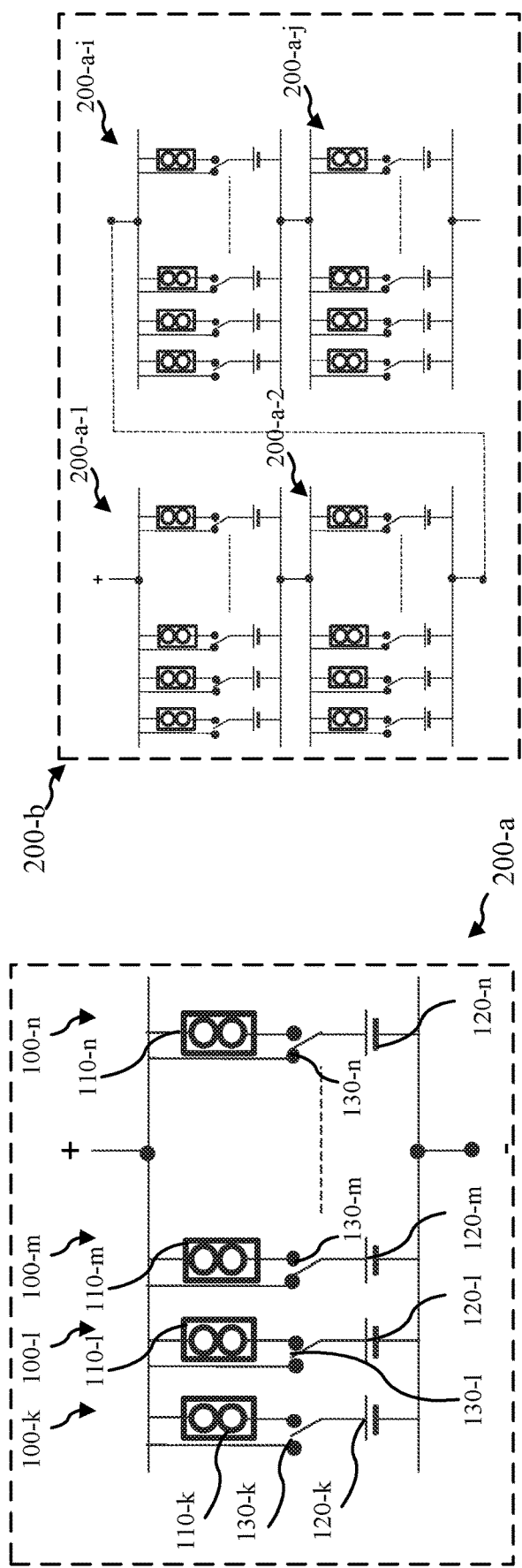
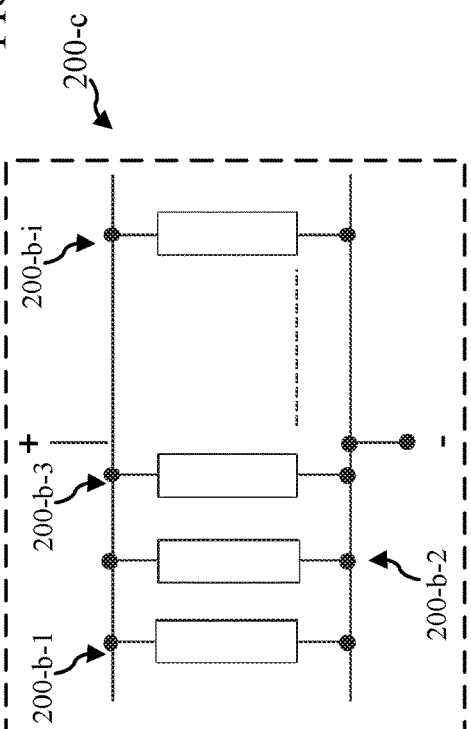
FIG. 2B
FIG. 2C
FIG. 2D

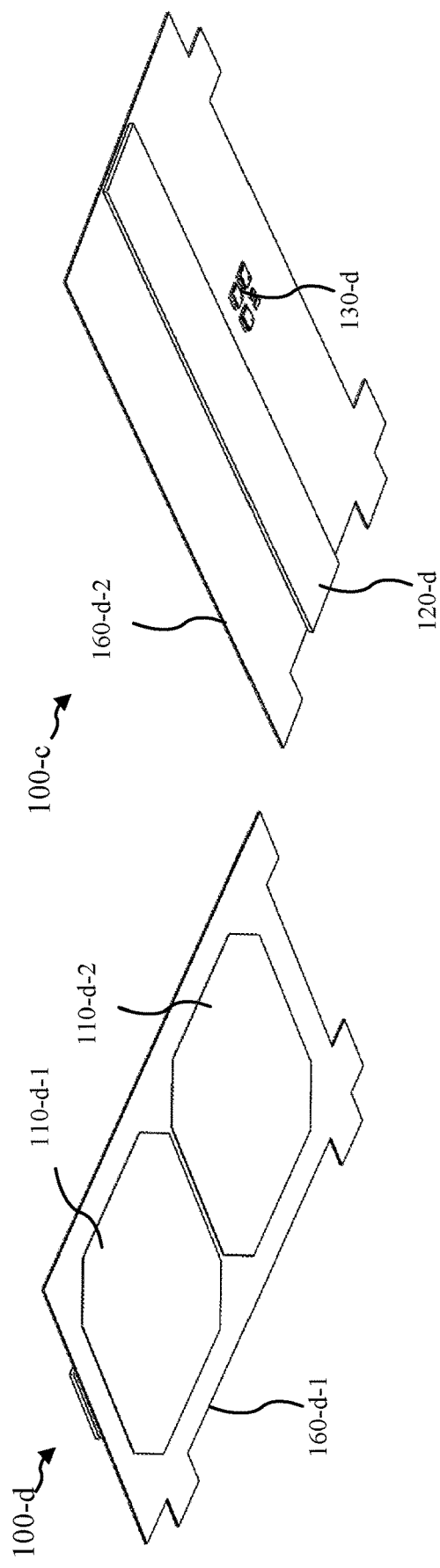
FIG. 4A
FIG. 4B
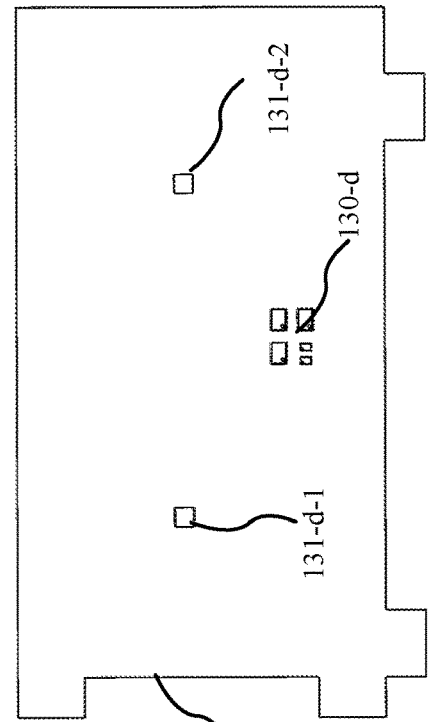
FIG. 4D
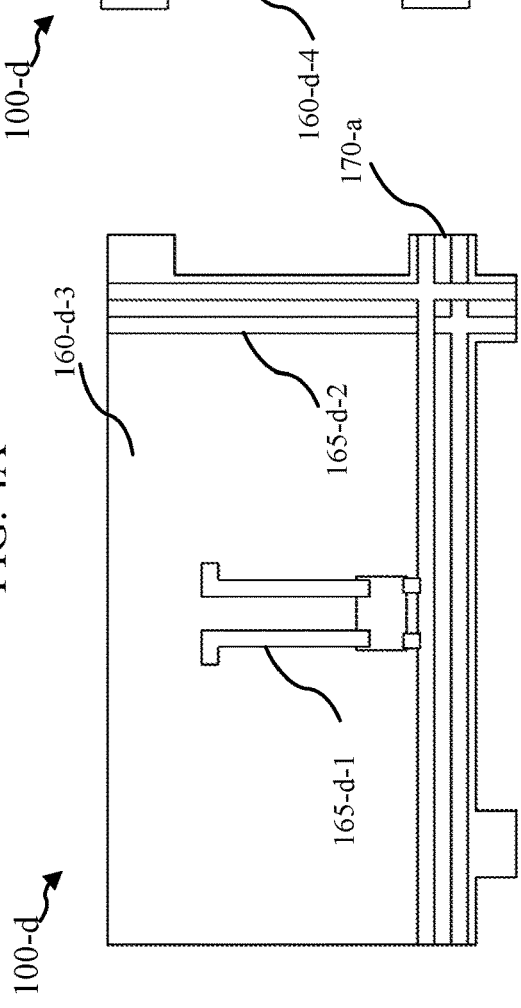
FIG. 4C

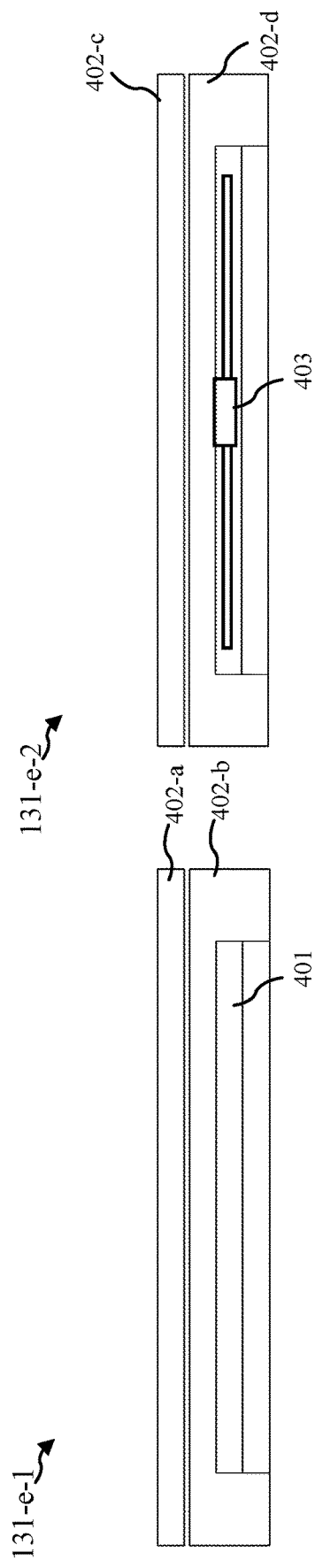
FIG. 4G
FIG. 4H
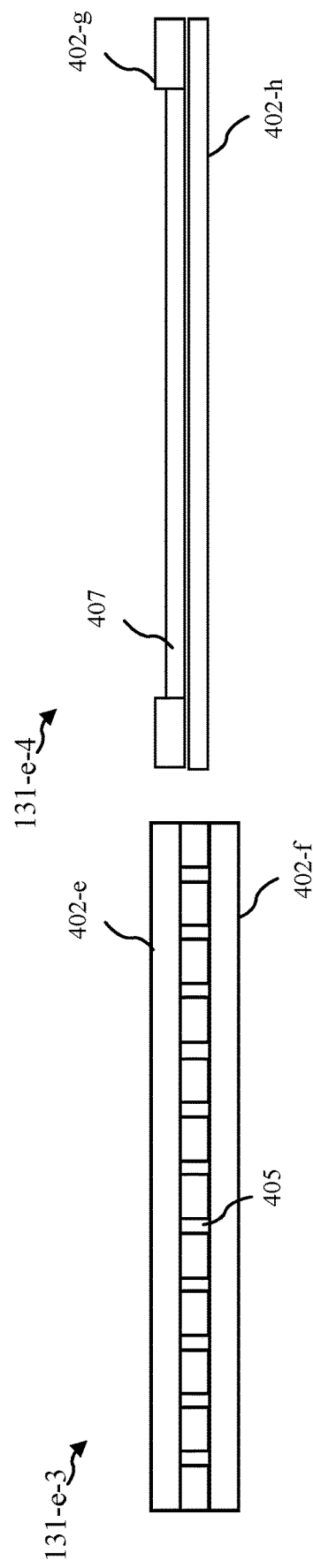
FIG. 4I
FIG. 4J

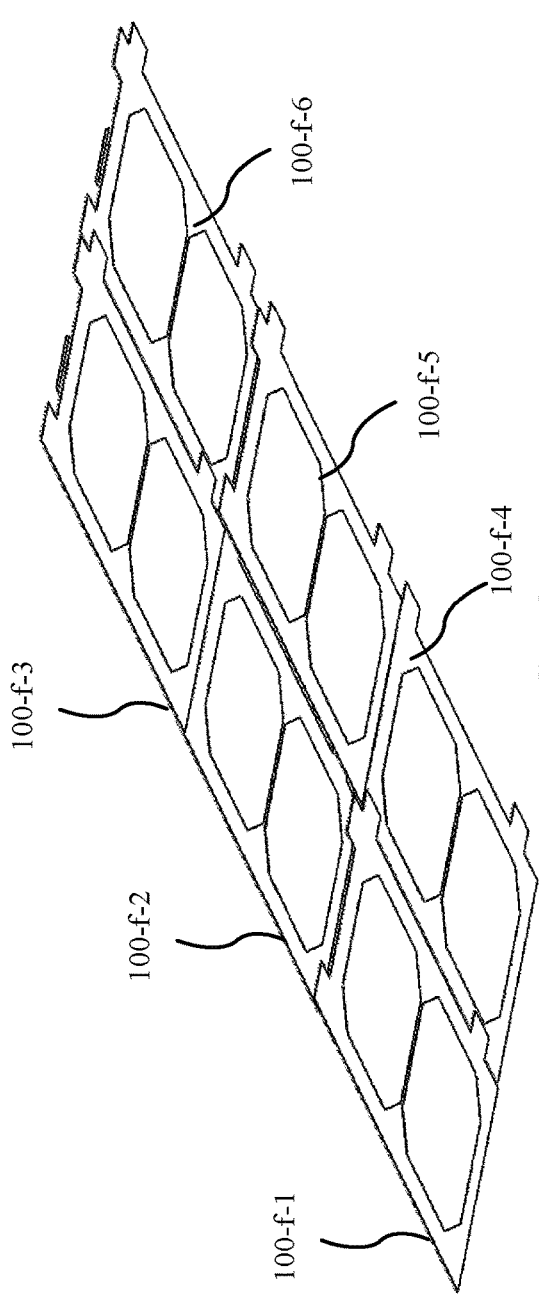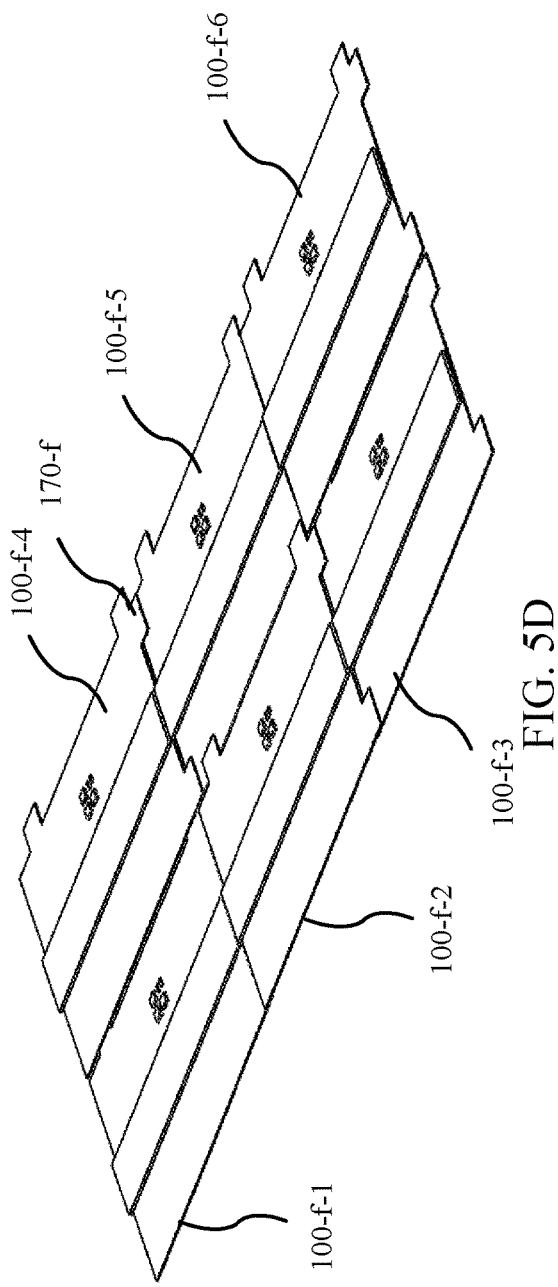

1001

Heat one or more rechargeable energy storage cells coupled with one or more solar cells as an integrated power module
1030

FIG. 10B

INTEGRATED POWER MODULE DEVICES, SYSTEMS, AND METHODS

BACKGROUND

Some electrical power systems, for space and/or terrestrial applications for example, may include solar array panels to collect sunlight and convert to electricity, batteries to store energy from the solar array panels, power distribution, and/or control electronics in order to regulate battery state of charge and/or supply energy to one or more loads supported by a system. Typically, the solar array panels and the batteries may be separated from each other to avoid heating the batteries, which may be detrimental to the batteries for a variety of reasons. However, some battery technologies may benefit from operating at temperatures that may involving heating the batteries (e.g., solid state batteries). Keeping solar array panels and batteries separated may also cause different space constraint problems, such as accommodating batteries onboard a spacecraft. There may be a need for new tools and techniques for devices, systems, and methods considering the evolving nature of energy storage technologies.

SUMMARY

Integrated power module devices, systems, and methods are provided in accordance with various embodiments. For example, some embodiments include a system that may include one or more integrated power modules. Each integrated power module may include: one or more solar cells; one or more rechargeable energy storage cells; and/or one or more circuits coupling the one or more solar cells with the one or more rechargeable energy storage cells.

In some embodiments, each integrated power module is configured such that the one or more rechargeable energy storage cells of the respective integrated power module are coupled with one or more back sides of the one or more solar cells. In some embodiments, at least two of the one or more integrated power modules are coupled with each other at least in parallel to form one or more parallel modules or in series to form one or more series modules. In some embodiments, at least two of the one or more parallel modules are coupled in series or two or more of the one or more series modules are coupled in parallel.

In some embodiments, each integrated power module includes one or more electrical interconnectors configured to couple each respective integrated power module with at least one other integrated power module at least in parallel or in series. In some embodiments, the one or more circuits are configured to control the charging of one or more rechargeable energy storage cells.

Some embodiments include one or more heaters coupled with the one or more rechargeable energy storage cells. The one or more rechargeable energy storage cells may include one or more rechargeable batteries. The one or more rechargeable batteries may include one or more solid state batteries.

In some embodiments, one or more rechargeable energy storage cells are thermally coupled with the one or more solar cells. The one or more rechargeable energy storage cells may be thermally coupled with the one or more solar cells through at least one of the one or more circuits coupling the one or more solar cells with the one or more rechargeable energy storage cells. At least one circuit thermally coupling the one or more solar cells with the one or more rechargeable energy storage cells may include a unidirectional circuit such that heat may be conducted from the one or more solar cells to the one or more rechargeable energy storage cells. In some embodiments, a unidirectional circuit may be utilized such that heat may be conducted from one or more heat sources on a spacecraft to the one or more rechargeable energy storage cells.

Some embodiments include one or more concentrators configured to increase an effective collection area and/or a conversion efficiency of the one or more solar cells. The one or more concentrators may include one or more lenses.

In some embodiments, the one or more integrated power modules are at least voltage matched or power matched across one or more ranges of load requirements with respect to one or more loads. In some embodiments, the one or more solar cells of a respective integrated power module are voltage matched with the one or more rechargeable storage cells of the respective integrated power module. Some embodiments include one or more loads coupled with the one or more integrated power modules.

In some embodiments, each integrated power module includes one or more substrates configured to couple at least the one or more solar cells, the one or more rechargeable energy storage cells, or the one or more circuits with each other. At least one of the one or more substrates may include one or more traces configured to couple at least the one or more solar cells, the one or more rechargeable energy storage cells, the one or more circuits, one or more heaters, or two or more of the one or more integrated power modules with each other.

In some embodiments, the one or more integrated power modules are coupled with a spacecraft. In some embodiments, the one or more integrated power modules are configured as a Z-fold wing. Some embodiments include a deployable boom coupled with the Z-fold wing. In some embodiments, the one or more integrated power modules are thermally isolated from a spacecraft. In some embodiments, the one or more integrated power modules may be mechanically separate from a spacecraft. In some embodiments, one or more integrated power modules are thermally coupled with one or more heat sources on a spacecraft such that heat passes from one or more heat sources on the spacecraft to the one or more rechargeable energy storage cells.

Some embodiments include a method that may include: determining at least a voltage requirement or a power requirement across one or more ranges of load requirements for one or more loads; and/or coupling one or more integrated power modules with each other to match at least the determined voltage requirement or the power requirement for the one or more loads.

Some embodiments include a method that may include heating one or more rechargeable energy storage cells coupled with one or more solar cells as an integrated power module. Heating the one or more rechargeable energy storage cells may utilize one or more heaters coupled with the one or more rechargeable energy storage cells. Heating the one or more rechargeable energy storage cells may utilize heat from the one or more solar cells. Heating the one or more rechargeable energy storage cells utilizing the heat from the one or more solar cells may include utilizing a unidirectional circuit such that heat is conducted from the one or more solar cells to the one or more rechargeable energy storage cells. In some embodiments, heating the one or more rechargeable energy storage cells utilizing the heat from the one or more solar cells may include utilizing one or more spacers positioned between the one or more solar cells and the one or more rechargeable energy storage cells. Heating the one or more rechargeable energy storage cells may utilize at least a charging or a discharging of the one or more rechargeable energy storage cells. Heating the one or more rechargeable energy storage cells may utilize heat from one or more heat sources on a spacecraft; this heating may utilize a unidirectional circuit such that the heat from the one or more heat sources on the spacecraft is conducted from the one or more heat sources on the spacecraft to the one or more rechargeable energy storage cells.

Some embodiments include methods, systems, and/or devices as described in the specification and/or shown in the figures.

The foregoing has outlined rather broadly the features and technical advantages of embodiments according to the disclosure in order that the detailed description that follows may be better understood. Additional features and advantages will be described hereinafter. The conception and specific embodiments disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2B shows a device and/or system in accordance with various embodiments.

FIG. 2C shows a device and/or system in accordance with various embodiments.

FIG. 2D shows a device and/or system in accordance with various embodiments.

FIG. 4A shows a device and/or system in accordance with various embodiments.

FIG. 4B shows a device and/or system in accordance with various embodiments.

FIG. 4C shows a device and/or system in accordance with various embodiments.

FIG. 4D shows a device and/or system in accordance with various embodiments.

FIG. 4G shows a device and/or system in accordance with various embodiments.

FIG. 4H shows a device and/or system in accordance with various embodiments.

FIG. 4I shows a device and/or system in accordance with various embodiments.

FIG. 4J shows a device and/or system in accordance with various embodiments.

FIG. 5C shows a device and/or system in accordance with various embodiments.

FIG. 5D shows a device and/or system in accordance with various embodiments.

FIG. 10B shows a flow diagram of a method in accordance with various embodiments.

DETAILED DESCRIPTION

Figure 1A:
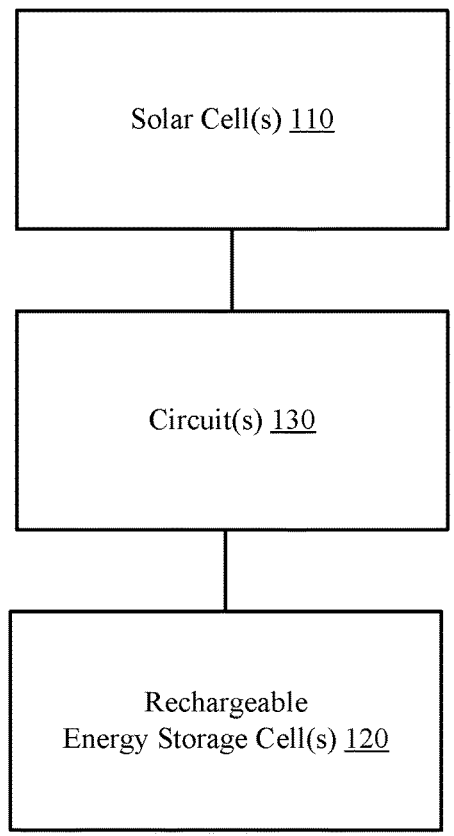
FIG. 1A shows a device and/or system in accordance with various embodiments.

This description provides embodiments, and is not intended to limit the scope, applicability, or configuration of the disclosure. Rather, the ensuing description will provide those skilled in the art with an enabling description for implementing embodiments of the disclosure. Various changes may be made in the function and arrangement of elements.

Thus, various embodiments may omit, substitute, or add various procedures or components as appropriate. For instance, it should be appreciated that the methods may be performed in an order different than that described, and that various stages may be added, omitted, or combined. Also, aspects and elements described with respect to certain embodiments may be combined in various other embodiments. It should also be appreciated that the following systems, devices, and methods may individually or collectively be components of a larger system, wherein other procedures may take precedence over or otherwise modify their application.

Integrated power module devices, systems, and methods are provided in accordance with various embodiments. Some embodiments may provide a variety of benefits such as reduced mass and/or volume with respect to current systems. This may be achieved in some embodiments through merging of rechargeable energy storage, solar arrays, and/or power electronics. Some embodiments include improved resiliency and/or reliability using highly modular architectures; massively parallel architecture may also allow for unprecedented fault tolerance. Some embodiments include improvements in recurring cost via production of module elements lending well to automated build and test, as well as decreased lead time due to the ability to stock integrated power modules that may be configured quickly to affect systems that may meet a wide range of power demands.

Some embodiments may be applicable to the areas of space solar array architecture, power generation, energy storage, and/or energy distribution. Some embodiments may enable more capable, resilient, and lower cost space components through exploiting the benefits of rechargeable energy storage cells, such as solid state batteries, including Advanced Solid State Batteries (ASSB), in an innovative Electrical Power System (EPS) architecture. Some embodiments may facilitate maximum benefit of ASSB technology through advancing space component capability in an affordable fashion.

Solid state batteries generally employ a solid electrolyte that may yield a highly volumetrically efficient system and simple cell architecture that may be manufactured using industry-standard roll-to-roll processes. This may allow for rechargeable energy storage cells that may be cut from a roll in highly customized shapes. Due to their solid electrolyte, the preferred operating temperature of inorganic-based SSB is typically over 50° C. with proven reliable operation at temperatures as high as 150° C. This characteristic may be significantly different to past space chemistries that typically may have a much tighter operating range (typically 10-30° C.) that has generally proven a major driver during spacecraft systems and thermal design. Integrated power modules in accordance with various embodiments may exploit this characteristic, integrating batteries within deployed solar panels where they may harvest both solar energy and their own self heating (during charge and discharge) to maintain operational temperature.

Some embodiments are inherently modular, which may allow spacecraft and other loads of different sizes and a wide range of power requirements to utilize EPS built up from a common integrated power module. This approach may allow recurring cost and lead time to be minimized with modules built ahead of time and EPS redundancy (and resiliency levels) tuned for the needs of the specific mission.

Some embodiments utilize Peak Power Tracking (PPT). In some embodiments, photovoltaic cell voltage is controlled to the Peak Power to minimize required solar cell area to meet the demand of the loads and battery charging. In some cases, the ASSB is connected to the wider EPS system supporting the power needs of the spacecraft loads at all times. Embodiments may provide a variety of advantages because charge control may be at the individual cell level, which may provide an extremely safe and robust fault-tolerant architecture in comparison to systems where charge control may occur at the battery level where cell-to-cell differences may lead to imbalance and/or cell overcharge that may propagate into safety issues. Some embodiments utilize Direct Energy Transfer (DET). In some embodiments, photovoltaic cell voltage is clamped to the ASSB cell and may fall with charge and discharge (orbital cycling). Some embodiments utilize a simple comparator circuit that may monitor ASSB cell voltage and may connect or disconnect PV charge to avoid overcharge. In some cases, the ASSB is connected to the wider EPS system supporting the power needs of the spacecraft loads at all times. The duty cycle of various embodiments may proceed as follows: in eclipse, the SSB cell may discharge to support spacecraft loads and in sunlight may be recharged. Once it reaches full charge, some embodiments may cycle with the frequency depending on instantaneous spacecraft loads. Embodiments may provide a variety of advantages because charge control may be at the individual cell level which may provide an extremely safe and robust fault-tolerant architecture in comparison to systems where charge control may occur at the battery level where cell-to-cell differences may lead to imbalance and/or cell overcharge that may propagate into safety issues.

Some embodiments may allow for mass savings and increased payload capability through integrating solar cells with rechargeable energy storage cells. More power may be made available for on-board systems that could increase resilience, configurability, and enable faster reconstitution via higher thrust electric propulsion.

Some embodiments enable a major reduction in EPS cost and lead time, which are generally key driving elements of spacecraft budgets and schedules. Some embodiments may provide for spacecraft system simplification using the modular approach of integrated power modules. Some embodiments educe mass and simplify harnessing.

Some embodiments may utilize rechargeable energy storage technologies that may perform optimally at elevated temperatures (e.g., 40 degrees Celsius or hotter, 60 degrees Celsius to 120 degrees Celsius). For example, solid state batteries are utilized in some embodiments. Heat may be provided from solar cells and/or heaters utilized in different embodiments. For example, some embodiments may include rechargeable energy storage cells mounted to the back of solar arrays, utilizing solar heating to warm the rechargeable energy storage cells. This may benefit the solar cells also through helping cool them, which may increase their efficiency. This integration of solar arrays and energy storage components may reduce parasitic mass and/or volume of array and energy storage packaging. Integrated power systems in accordance with various embodiments may also result in narrower temperature swings. Some embodiments may also have the benefits of both small cell and large cell configurations, including the fault tolerance of small cell arrays and cell performance of large cell arrays. Some embodiments may provide self-heating of the batteries through the charging and discharging phases.

Turning now to FIG. 1A, a device 100 is provided in accordance with various embodiments. Device 100 may be referred to as an integrated power module in some embodiments. The integrated power module 100 may include one or more solar cells 110 and one or more rechargeable energy storage cells 120. The integrated power module 100 may include one or more circuits 130 coupling the one or more solar cells 110 with the one or more rechargeable energy storage cells 120. Some embodiments may include multiple integrated power modules 100.

In some embodiments, each integrated power module 100 is configured such that the one or more rechargeable energy storage cells 120 of the respective integrated power module 100 are coupled with one or more back sides of the one or more solar cells 110. In some embodiments, at least two of the one or more integrated power modules 100 are coupled with each other at least in parallel to form one or more parallel modules or in series to form one or more series modules. In some embodiments, at least two of the one or more parallel modules are coupled in series or two or more of the one or more series modules are coupled in parallel.

In some embodiments, each integrated power module 100 includes one or more electrical interconnectors configured to couple each respective integrated power module 100 with at least one other integrated power module 100 at least in parallel or in series. In some embodiments, the one or more circuits 130 are configured to control the charging of one or more rechargeable energy storage cells 120.

Some embodiments include one or more heaters coupled with the one or more rechargeable energy storage cells 120. The one or more rechargeable energy storage cells 120 may include one or more rechargeable batteries. The one or more rechargeable batteries may include one or more solid state batteries. In some embodiments, the one or more rechargeable energy storage cells 120 utilize a chemistry configured to operate above 40 degrees Celsius. The chemistry may be configured to operate above 40 degrees Celsius to avoid at least an appreciable loss of capacity, a life-time degradation, or forming a safety hazard. In some embodiments, the one or more rechargeable energy storage cells 120 may include one or more fuel cells. The one or more fuel cells may include one or more regenerative fuel cells, for example.

In some embodiments, one or more rechargeable energy storage cells 120 are thermally coupled with the one or more solar cells 110. The one or more rechargeable energy storage cells 120 may be configured to exchange heat with the one or more solar cells 110. For example, the one or more rechargeable energy cells 120 may be configured to receive heat from the one or more solar cells 110. The one or more rechargeable energy storage cells 120 may be thermally coupled with the one or more solar cells 110 through at least one of the one or more circuits 130 coupling the one or more solar cells 110 with the one or more rechargeable energy storage cells 120. The at least one circuit 130 thermally coupling the one or more solar cells 110 with the one or more rechargeable energy storage cells 120 may include a unidirectional circuit such that heat may be conducted from the one or more solar cells 110 to the one or more rechargeable energy storage cells 120; in some embodiments, the unidirectional circuit may be referred to as a thermal switch. In some embodiments, a unidirectional circuit may be utilized such that heat may be conducted from one or more heat sources on a spacecraft to the one or more rechargeable energy storage cells 120. In some embodiments, the one or more rechargeable energy storage cells 120 may be configured to exchange heat with each other.

The one or more rechargeable energy storage cells 120 may be thermally coupled with the one or more solar cells 110 in a variety of ways. The one or more rechargeable energy storage cells 120 may be configured to exchange heat with the one or more solar cells 110 through being coupled with a back side of the one or more solar cells 110. In some embodiments, the one or more rechargeable energy storage cells 120 may receive heat from the one or more solar cells 110 through the proximity of the one or more rechargeable energy cells 120 with respect to the one or more solar cells 110. In some embodiments, the one or more rechargeable energy storage cells 120 are configured to form a heat sink for the one or more solar cells 110.

Some embodiments include one or more concentrators configured to increase an effective collection area and/or a conversion efficiency of the one or more solar cells 110. The one or more concentrators may include one or more lenses. In some embodiments, the one or more concentrators may include one or more reflectors, such as parabolic reflectors.

In some embodiments, the one or more integrated power modules 100 are at least voltage matched or power matched across one or more ranges of load requirements with respect to one or more loads. In some embodiments, the one or more solar cells 110 of a respective integrated power module 100 are voltage matched with the one or more rechargeable storage cells 120 of the respective integrated power module 100. Some embodiments include one or more loads coupled with the one or more integrated power modules 100.

In some embodiments, each integrated power module 100 includes one or more substrates configured to couple at least the one or more solar cells 110, the one or more rechargeable energy storage cells 120, or the one or more circuits 130 with each other. At least one of the one or more substrates may include one or more traces configured to couple at least the one or more solar cells 110, the one or more rechargeable energy storage cells 120, the one or more circuits 130, one or more heaters, or two or more of the one or more integrated power modules 100 with each other.

In some embodiments, the one or more integrated power modules 100 are coupled with a spacecraft. In some embodiments, the one or more integrated power modules 100 are configured as a Z-fold wing. Some embodiments include a deployable boom coupled with the Z-fold wing. In some embodiments, the one or more integrated power modules 100 are thermally isolated from a spacecraft. Other configurations may be utilized, such as one or more integrated power modules 100 attached to a side of a spacecraft. In some embodiments, the one or more integrated power modules 100 may extend from a side or edge of a spacecraft. In some embodiments, the one or more integrated power modules 100 may be physically separated from the spacecraft. In some embodiments, the one or more integrated power modules 100 may be mechanically separate from a spacecraft. In some embodiments, one or more integrated power modules 100 are thermally coupled with one or more heat sources on a spacecraft such that heat passes from one or more heat sources on the spacecraft to the one or more rechargeable energy storage cells 120. In some embodiments, the one or more rechargeable energy storage cells 120 provide a heat sink for the one or more heat sources of the spacecraft.

Figure 1B:
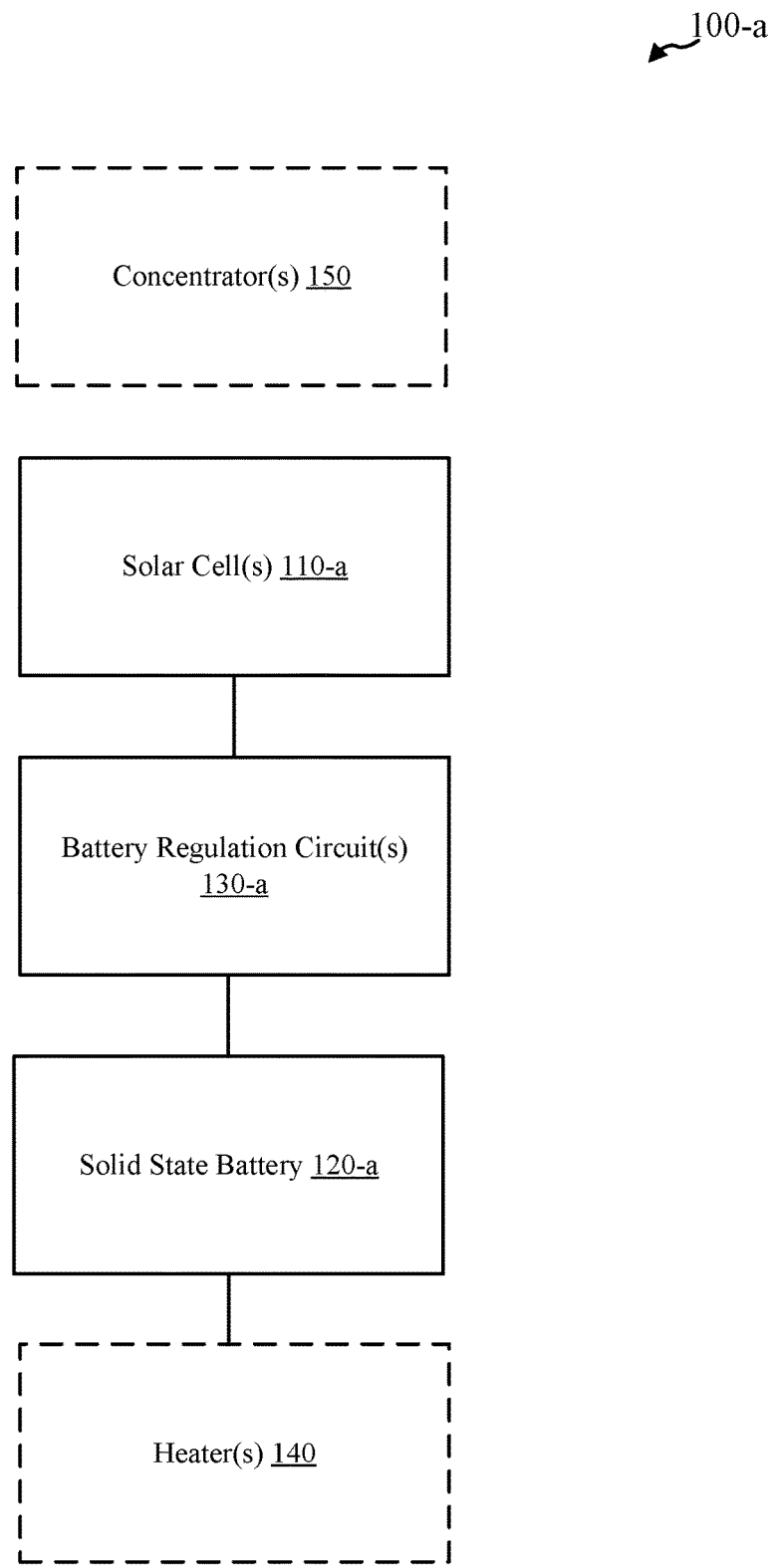
FIG. 1B shows a device and/or system in accordance with various embodiments.

FIG. 1B provides an example of a device 100-a in accordance with various embodiments. Device 100-a may be an example of device 100 of FIG. 1A. Device 100-a may be referred to as an integrated power module. Device 100-a may include one or more solar cells 110-a that may be coupled with one or more solid state batteries 120-a utilizing one or more battery regulation circuits 130-a. The one or more battery regulation circuits 130-a may control when and how the one or more solid state batteries 120-a are charged utilizing the one or more solar cells 110-a.

Device 100-a may include additional components. For example, device 100-a may include one or more heaters 140, which may be utilized to heat the one or more solid state batteries 120-a. For example, the one or more heaters 140 may facilitate keeping the one or more solid state batteries 120-a above a certain temperature, which may facilitate better performance. For example, some embodiments may configure the one or more heaters 140 to heat the one or more solid state batteries 120-a above 40 degrees Celsius. While the one or more heaters 140 may be utilized in some embodiments, some embodiments may utilize heat from the solar cells 110-a to facilitate heating the one or more solid state batteries 120-a.

Device 100-a may include one or more concentrators 150. The one or more concentrators 150 may be configured to increase an effective collection area and/or a conversion efficiency of the one or more solar cells 110-a. The one or more concentrators 150 may include one or more lenses, for example. Other concentrators 150 may be utilized, including, but not limited to, parabolic reflectors.

Figure 1C:
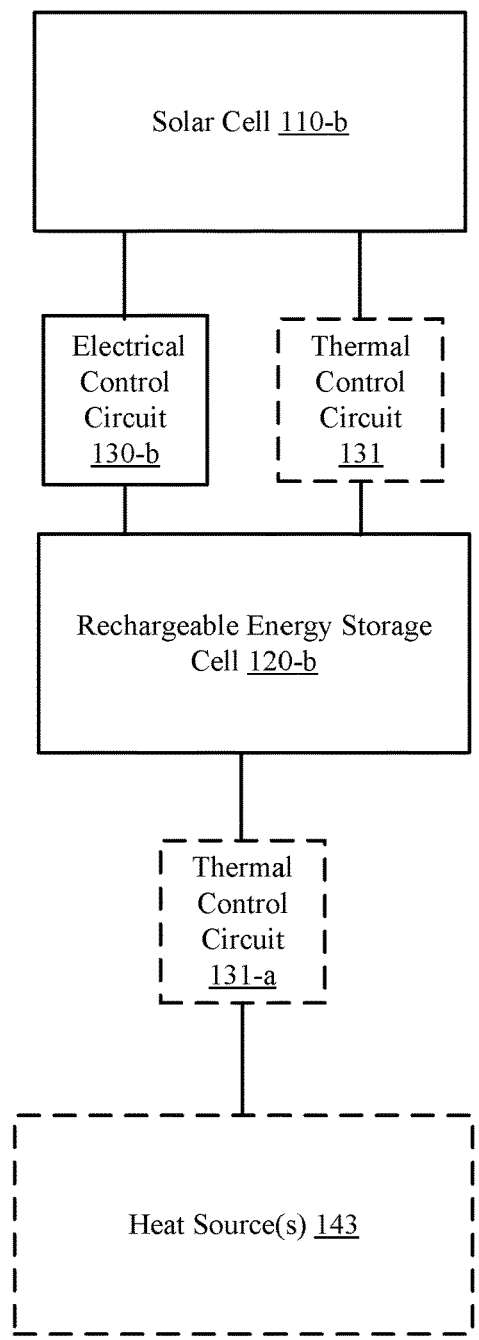
FIG. 1C shows a device and/or system in accordance with various embodiments.

FIG. 1C shows another device 100-b in accordance with various embodiments. Device 100-b may be described as an integrated power module. Device 100-b may be an example of device 100 of FIG. 1A and/or device 100-a of FIG. 1B. Device 100-b may include one or more solar cells 110-b and one or more rechargeable energy storage cells 120-b, which may be coupled with each other utilizing one or more electrical control circuits 130-b and/or one or more thermal control circuits 131. The one or more electrical control circuits 130-b may be utilized to control a charging of the one or more rechargeable energy storage cells 120-b. The one or more thermal control circuits 131 may be utilized to thermally couple the one or more rechargeable energy storage cells 120-b with the one or more solar cells 110-b. The one of more thermal control circuits 131 may include a unidirectional circuit such that heat may be conducted from the one or more solar cells 110-b to the one or more rechargeable energy storage cells 120-b. For example, the unidirectional circuit may conduct heat from the one or more solar cells 110-b to the one or more rechargeable energy storage cells 120-b when the one or more solar cells 110-b may be heated through solar exposure. During eclipse, the unidirectional circuit may switch off such that heat does not pass between the one or more solar cells 110-b and the one or more rechargeable energy storage cells 120-b, which may allow the one or more rechargeable energy storage cells 120-b to avoid losing heat through heat conducting back to the one or more solar cells 110-b. The thermal control circuit 131 may be referred to as a thermal switch in some embodiments. In some embodiments, the thermal control circuit 131 may act as a standoff or spacer to separate the main portions of the one or more solar cells 110-b and the one or more rechargeable energy storage cells 120-b so that heat conduction between these components may be controlled and/or limited.

In some embodiments, a thermal control circuit 131-a may be utilized such that heat may be conducted from one or more heat sources 143 to the one or more rechargeable energy storage cells 120-b. For example, the thermal control circuit 131-a may include a unidirectional circuit such that heat passes from the one or more heat sources 143 to the one or more rechargeable energy storage cells 120-b. In some embodiments, the one or more heat sources 143 may be on a spacecraft, for example. In some embodiments, the one or more heat sources 143 may include one or more loads of the spacecraft. For example, during sunlit periods, the one or more rechargeable energy storage cells 120-b may be hotter than the loads of a spacecraft and the thermal control circuit 131-a may stop heat coming into the spacecraft. During eclipse, the one or more rechargeable energy storage cells 120-b may cool and the spacecraft loads may dump heat into the one or more rechargeable energy storage cells 120-b, which may keep them warm. The use of one or more thermal control circuits 131-a with respect the one or more rechargeable energy storage cells 120-b and one or more hot spacecraft loads may allow the payload to stay cooler during sunlit periods as well as providing more thermal energy to warm the one or more rechargeable energy storage cells 120-b in eclipse.

Figure 2A:
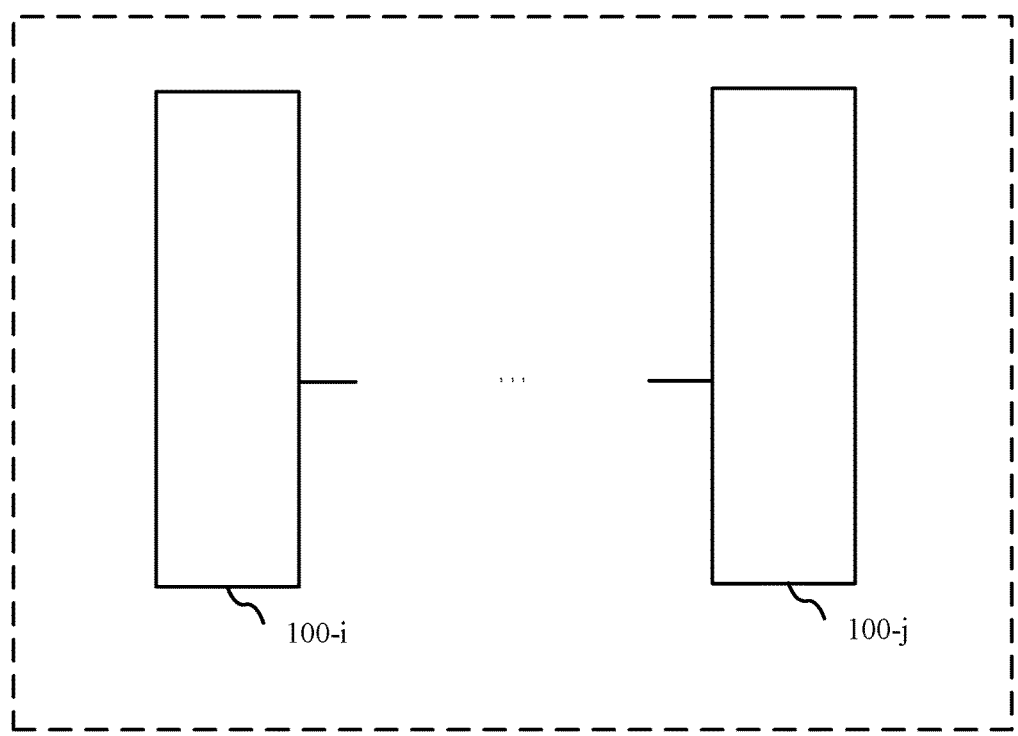
FIG. 2A shows a device and/or system in accordance with various embodiments

Turning now to FIG. 2A, a system 200 in accordance with various embodiments is provided. System 200 may be referred to as an integrated power module system. System 200 includes multiple devices 100-i, 100-j, which may be referred to as integrated power modules. While two devices 100-i, 100-j are shown, some embodiments may include more devices 100. Devices 100-i, 100-j may be examples of device 100 of FIG. 1A, device 100-a of FIG. 1B, and/or device 100-b of FIG. 1C, for example.

The multiple integrated power modules 100-i, 100-j may be coupled with each other in a variety of ways. For example, at least two of the integrated power modules 100-i, 100-j may be coupled with each other in parallel to form one or more parallel modules. In some embodiments, two or more of the parallel modules may be coupled with each other in series. This may be referred to as a p-s topology. In some embodiments, at least two of the integrated power modules 100-i, 100-j may be coupled with each other in series to form one or more series modules. In some embodiments, two or more of the series modules may be coupled with each other in parallel. This may be referred to as an s-p topology.

The arrangement of multiple integrated power modules 100-i, 100-j may depend on one or more loads. For example, the configuration of one or more integrated power modules coupled with each other in series and/or in parallel may be at least voltage matched or power matched across one or more ranges of load requirements with respect to one or more loads. In some embodiments, the multiple integrated power modules 100-i, 100-j may be configured to exchange heat with each other.

Turning now to FIG. 2B, FIG. 2C, and FIG. 2D, systems 200-a, 200-b, and 200-c are provided in accordance with various embodiments. Systems 200-a, 200-b, and 200-c may be examples of system 200 of FIG. 2A.

For example, system 200-a of FIG. 2B may include multiple devices 100-k, 100-l, 100-m, 100-n; while four devices 100 are shown in system 200-a, some embodiments may include more or fewer devices 100. Devices 100-k, 100-l, 100-m, 100-n may be referred to as integrated power modules in some embodiments. System 200-a may be referred to as a parallel module. Each of the devices 100-k, 100-l, 100-m, 100-n may include one or more solar cells 110-k, 110-l, 110-m, 110-n, one or more circuits 130-k, 130-l, 130-m, 130-n, and/or one or more rechargeable energy storage cells 120-k, 120-l, 120-m, 120-n. The multiple devices 100-k, 100-l, 100-m, 100-n may be coupled with each other in parallel to form one or more parallel modules. Through coupling multiple devices 100-k, 100-l, 100-m, 100-n with each other in parallel, the parallel module may be robust with respect to possible failure of individual devices 100-k, 100-l, 100-m, 100-n. The number of devices 100-k, 100-l, 100-m, 100-n utilized may depend on specific requirements, such as operating voltage, energy, and/or current. For example, the combination of devices 100-k, 100-l, 100-m, 100-n, as a group and/in combination of other groups of devices 100, may be at least voltage matched or power matched across one or more ranges of load requirements with respect to one or more loads. The parallel module of FIG. 2B may form in effect a virtual cell made up of parallel devices 100-k, 100-l, 100-m, 100-n. Each device 100-k, 100-l, 100-m, 100-n may operate its own regulation circuit 130-k, 130-l, 130-m, 130-n.

FIG. 2C shows a system 200-*b* that may include multiple parallel modules 200-*a*-1, 200-*a*-2, 200-*a-i*, and/or 200-*a-j*; while system 200-*b* may show four parallel modules, some embodiments may include more or fewer parallel modules. Parallel modules 200-*a*-1, 200-*a*-2, 200-*a-i*, and/or 200-*a-j* may be examples of system 200 of FIG. 2A and/or 200-*a* of FIG. 2B. In some embodiments, the multiple parallel modules 200-*a*-1, 200-*a*-2, 200-*a-i*, and/or 200-*a-j* are coupled with each other in series to form one or more series modules. The multiple parallel modules connected in series may be built based on different supply voltage range requirements. In general, current may be the same through each series module, but may be split between the integrated power modules of each parallel module. In some embodiments, voltage of each parallel module may be slightly different.

FIG. 2D shows a system 200-*c* that may include multiple series modules 200-*b*-1, 200-*b*-2, 200-*b*-3, and/or 200-*b-i*; while system 200-*c* may show four series modules, some embodiments may include more or fewer series modules. Series modules 200-*b*-1, 200-*b*-2, 200-*b*-3, and/or 200-*b-i* may be examples of series module 200-*b* of FIG. 2C; each series modules may include multiple parallel modules that may each include multiple integrated power modules. In some embodiments, the multiple series modules 200-*b*-1, 200-*b*-2, 200-*b*-3, and/or 200-*b-i* are coupled with each other in parallel. The multiple series modules may be connected in parallel to build up a required total system capacity, for example. System 200-*c* may be referred to as an integrated power system in some embodiments.

In general, the different systems 200-*a*, 200-*b*, and/or 200-*c* may be configured to be at least voltage matched or power matched across one or more ranges of load requirements with respect to one or more loads. Furthermore, while system 200-*a* may be built from multiple integrated power modules in parallel, other embodiments may start with multiple integrated power modules in series to form a series module; multiple series modules may then be coupled in parallel to form a parallel module, and so on.

Figure 3A:
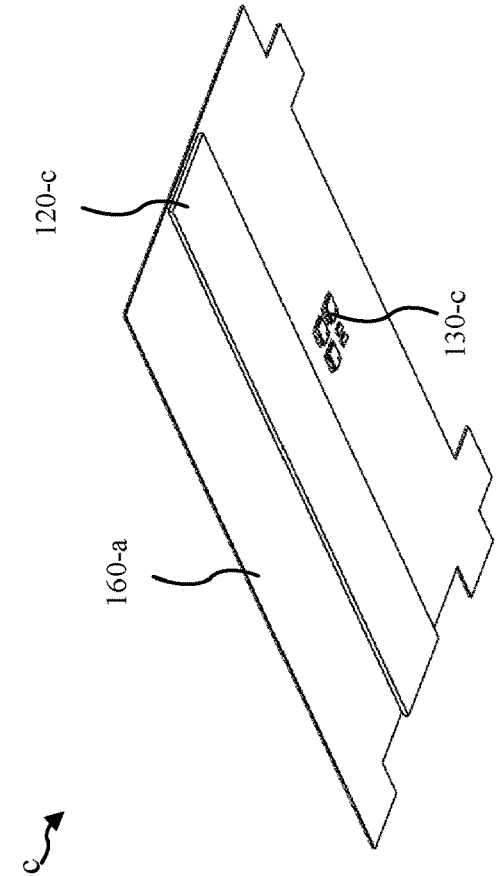
FIG. 3A shows a device and/or system in accordance with various embodiments.
Figure 3B:
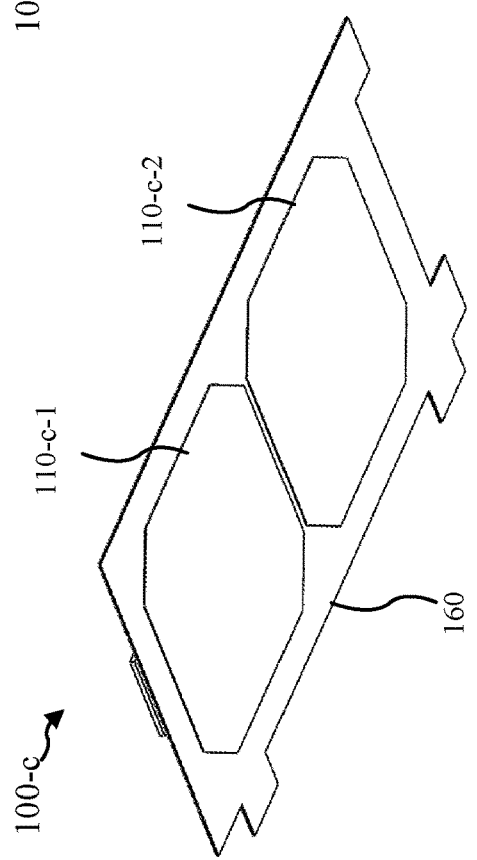
FIG. 3B shows a device and/or system in accordance with various embodiments.
Figure 3C:
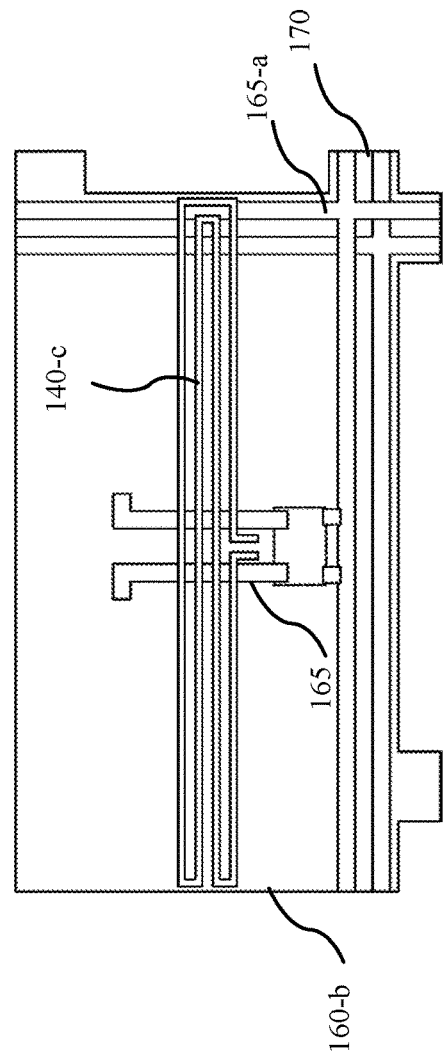
FIG. 3C shows a device and/or system in accordance with various embodiments.

Turning now to FIG. 3A, FIG. 3B, and FIG. 3C, three different perspectives of aspects of a device 100-*c* are provided in accordance with various embodiments. FIG. 3A may provide a top perspective, FIG. 3B may provide a bottom perspective, and FIG. 3C may show an interior perspective. Device 100-*c* may be referred to as an integrated power module. Device 100-*c* may be an example of device 100 of FIG. 1A, FIG. 1B, FIG. 1C, FIG. 2A, FIG. 2B, FIG. 2C, and/or FIG. 2D.

Device 100-*c* may include one or more solar cells 110-*c*-1, 110-*c*-2; for example, device 100-*c* may include two photovoltaic solar cells. Device 100-*c* may also include one or more rechargeable energy storage cells 120-*c*, which may include rechargeable batteries, including, but not limited to, solid state batteries. The number of solar cells 110-*c* may be voltage matched with the rechargeable energy storage cells 120-*c*.

FIG. 3A may show solar cells 110-*c*-1, 110-*c*-2 coupled with a substrate 160. In some embodiments, the substrate 160 may be formed from a composite material. In some embodiments, the substrate 160 may include a Kapton layer.

FIG. 3B may show the one or more rechargeable energy storage cells 120-*c* that may be coupled with a substrate 160-*a*; in some embodiments, substrate 160-*a* and substrate 160 may be separate and/or integrated layers; in some embodiments, substrate 160-*a* may include a Kapton board and/or layer. FIG. 3B may also show a circuit 130-*c*, which may be utilized as a control circuit such as to control the charging of the one or more rechargeable energy storage cells 120-*c*.

Figure 3D:
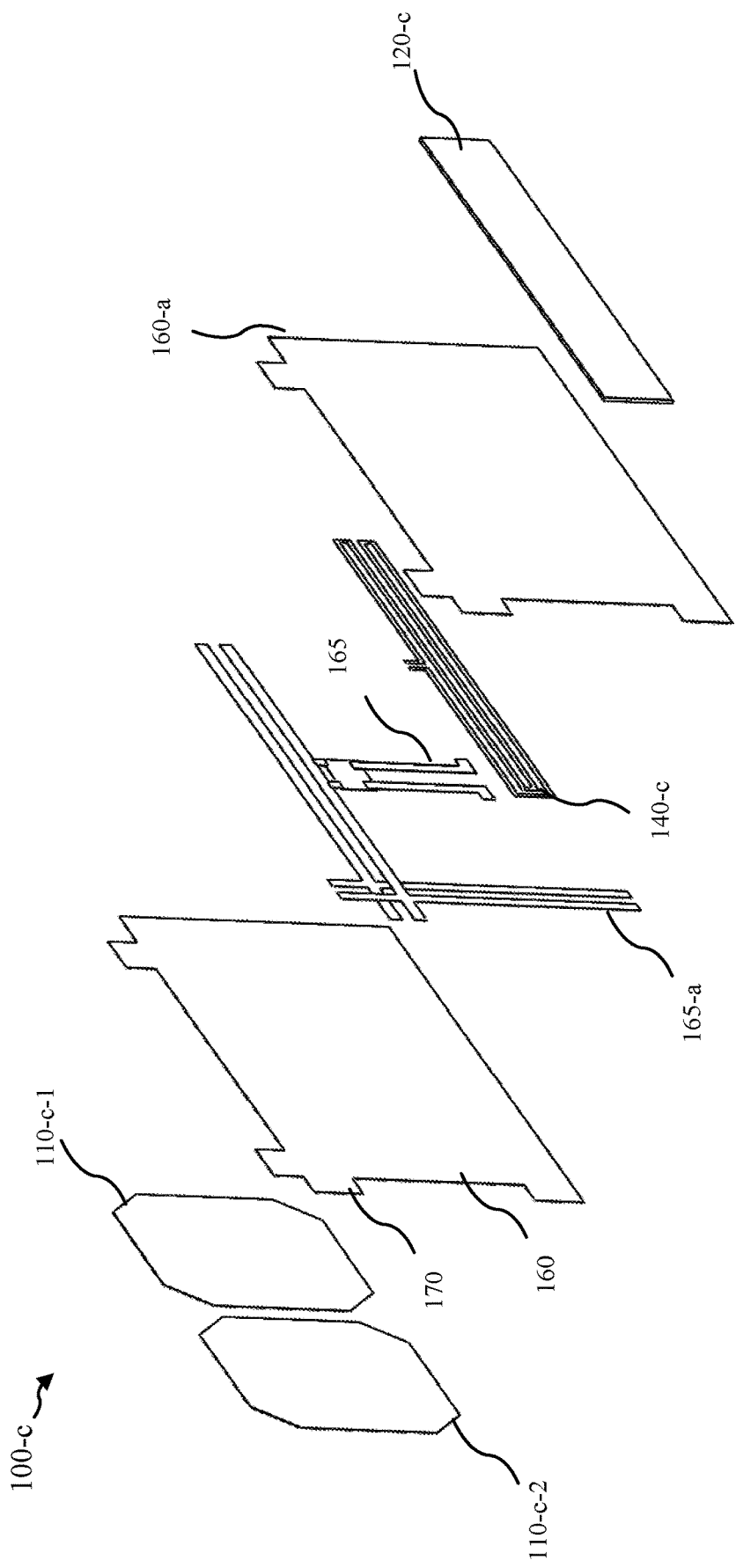
FIG. 3D shows a device and/or system in accordance with various embodiments.

FIG. 3C may show an interior perspective of device 100-*c*. For example, a substrate 160-*b* may be shown that may be separate and/or integrated with substrates 160 and/or 160-*a*; in some embodiments, substrate 160-*b* may include a Kapton board and/or layer. FIG. 3C may show one or more heaters 140-*c* that may be utilized to heat the one or more rechargeable energy storage cells 120-*c*. FIG. 3C may show one or more traces 165 that may be utilized to couple the various components of device 100-*c* with each other, such as the one or more solar cells 110-*c*-1, 110-*c*-2, the one or more rechargeable energy storage cells 120-*c*, the circuits 130-*c*, and/or the one or more heaters 140-*c*. Traces 165-*a* may also be utilized to electrically couple the integrated power module 110-*c* with other similar modules, either in parallel and/or series. Traces 165, 165-*a* may be integrated into substrate 160-*b*. One or more electrical interconnectors 170 may be utilized to facilitate physically and/or electrically coupling one or more integrated power modules 100-*c* with each other in parallel and/or in series. FIG. 3D show an exploded view of aspects of device 100-*c* in accordance with various embodiments.

Merely by way of example, the two solar cells 110-*c*-1, 110-*c*-2 may be coupled with each other in series that may facilitate operating close to the photovoltaic peak power point (PPT). The series coupled photovoltaic cells 110-*c*-1, 110-*c*-2 may match with the rechargeable energy storage cell 120-*c*, which may be an example of a solid state battery such as an ASSB. Some embodiments may utilize a an approximately credit card form factor ASSB. In some embodiments, the substrate 160 may include a thin composite facesheet that may give a structural base that may be used to mount the solar cells 110-*c*-1, 110-*c*-2 with respect to the one or more other substrates 160-*a*, 160-*b* for example, which may include a Kapton board. Traces 165-*a* may include bus bar traces within substrate 160-*b*, which may be used to connect multiple integrated power modules 110-*c* in series and/or parallel to build panels of sufficient voltage and power for specific load requirements. Multiple integrated power modules 110-*c* may be connected to build up power for an entire spacecraft, for example, in various architectures. Heater 140-*c* may provide heat to the rechargeable energy storage cell 120-*c* during eclipse for example, although self heating from internal resistance may be sufficient in some cases.

Turning now to FIG. 4A, FIG. 4B, FIG. 4C, and FIG. 4D, four different perspectives of a device 100-*d* are provided in accordance with various embodiments. FIG. 4A may provide a top perspective and FIG. 4B may provide a bottom perspective, while FIG. 4C and FIG. 4D may show interior perspectives. Device 100-*d* may be referred to as an integrated power module. Device 100-*d* may be an example of device 100 of FIG. 1A, FIG. 1B, FIG. 1C, FIG. 2A, FIG. 2B, FIG. 2C, and/or FIG. 2D. Device 100-*d* may include aspects of device 100-*d* of FIG. 3A, FIG. 3B, FIG. 3C, and/or FIG. 3D.

For example, device 100-*d* may include one or more solar cells 110-*d*-1, 110-*d*-2; for example, device 100-*d* may include two photovoltaic solar cells. Device 100-*d* may also include one or more rechargeable energy storage cells 120-*d*, which may include rechargeable batteries, including, but not limited to, solid state batteries. The number of solar cells 110-*d* may be voltage matched with the rechargeable energy storage cells 120-*d*.

FIG. 4A may show solar cells 110-*d*-1, 110-*d*-2 coupled with a substrate 160-*d*-1. In some embodiments, the substrate 160-*d*-1 may be formed from a composite material. In some embodiments, the substrate 160-*d*-1 may include a Kapton layer or board.

FIG. 4B may show the one or more rechargeable energy storage cells 120-*d* that may be coupled with a substrate 160-*d*-2; in some embodiments, substrate 160-*d*-1 and substrate 160-*d*-2 may be separate and/or integrated layers; in some embodiments, substrate 160-*d*-2 may include a Kapton board and/or layer. FIG. 4B may also show a circuit 130-*d*, which may be utilized as a control circuit such as to control the charging of the one or more rechargeable energy storage cells 120-*d*.

FIG. 4C may provide an interior layer perspective of device 100-*d*. For example, a substrate 160-*d*-3 may be shown that may be separate and/or integrated with substrates 160-*d*-1 and/or 160-*d*-2; in some embodiments, substrate 160-*d*-3 may include a Kapton board and/or layer. FIG. 4C may show one or more traces 165-*d*-1, 165-*d*-2 that may be utilized to couple the various components of device 100-*d* with each other, such as the one or more solar cells 110-*d*-1, 110-*d*-2, the one or more rechargeable energy storage cells 120-*d*, and/or the circuits 130-*d*, traces 165-*d*-2 may also be utilized to couple the integrated power module 110-*d* with other similar modules, either in parallel and/or series. Traces 165-*d*-1, 165-*d*-2 may be integrated into substrate 160-*d*-3. One or more electrical interconnectors 170-*a* may be utilized to facilitate physically and/or electrically coupling one or more integrated power modules 100-*d* with each other in parallel and/or in series.

Figure 4E:
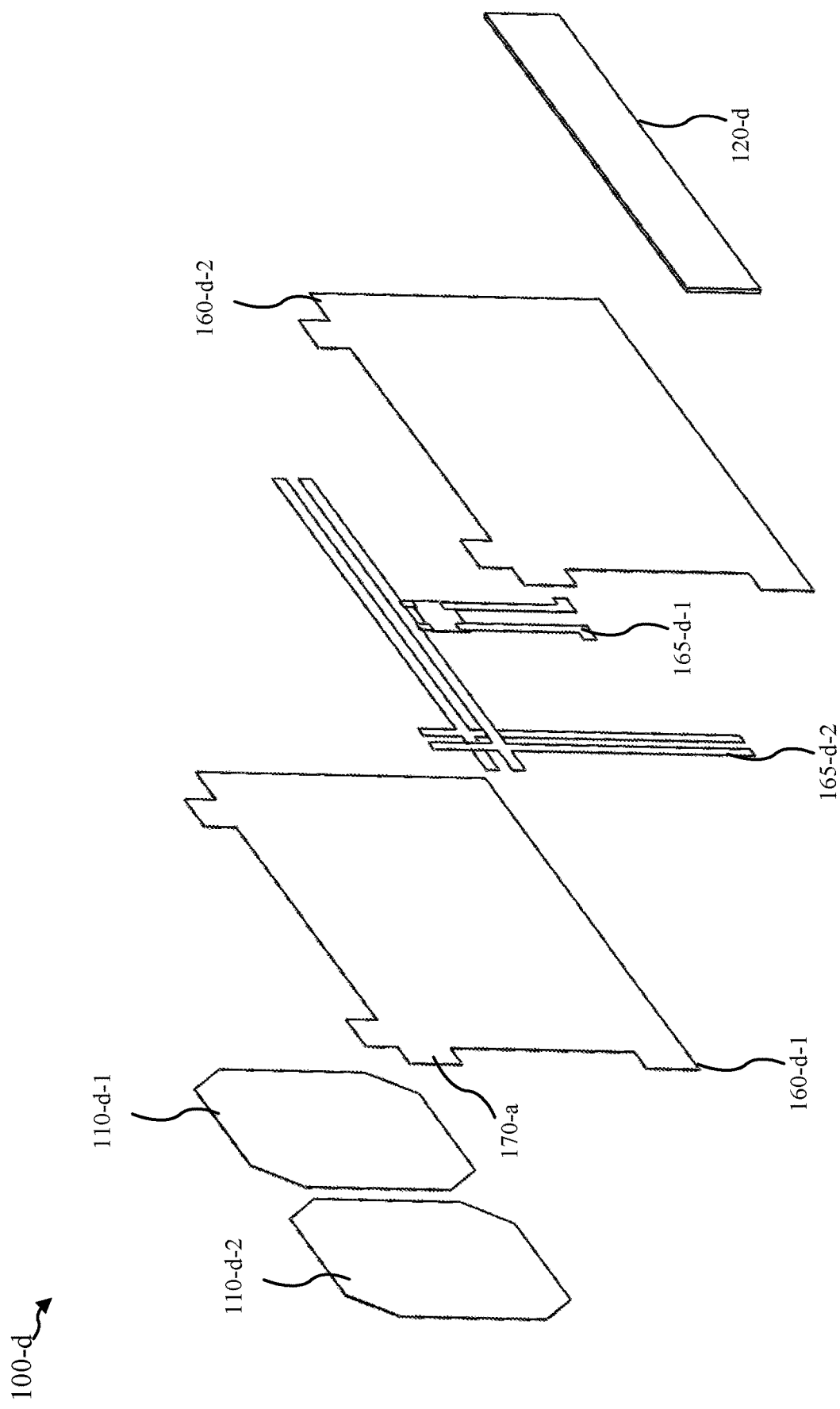
FIG. 4E shows a device and/or system in accordance with various embodiments.

FIG. 4D may provide another interior layer perspective of device 100-*d*. For example, a substrate 160-*d*-4 may be shown that may be separate and/or integrated with substrates 160-*d*-1, 160-*d*-2, and/or 160-*d*-3. FIG. 4D may also show control circuit(s) 130-*d* along with standoff components 131-*d*-1, 131-*d*-2. Standoff components 131-*d*-1, 131-*d*-2 may be configured for a variety of purposes. For example, in some embodiments, standoff components 131-*d*-1, 131-*d*-2 may facilitate thermally isolating and/or thermally controlling heat passing between the one or more solar cells 110-*d*-1, 110-*d*-2 and the one or more rechargeable energy storage cells 120-*d*. In some embodiments, standoff components 131-*d*-1, 131-*d*-2 may include one or more thermal control circuits coupling the one or more solar cells 110-*d*-1, 110-*d*-2 with the one or more rechargeable energy storage cells 120-*d*, which may include a unidirectional circuit such that heat may be conducted from the one or more solar cells 110-*d*-1, 110-*d*-2 to the one or more rechargeable energy storage cells 120-*d*. In some embodiments, the standoff components 131-*d*-1, 131-*d*-2 may be configured as spacers. FIG. 4E shows an exploded view of aspects of device 100-*d* in accordance with various embodiments.

Figure 4F:
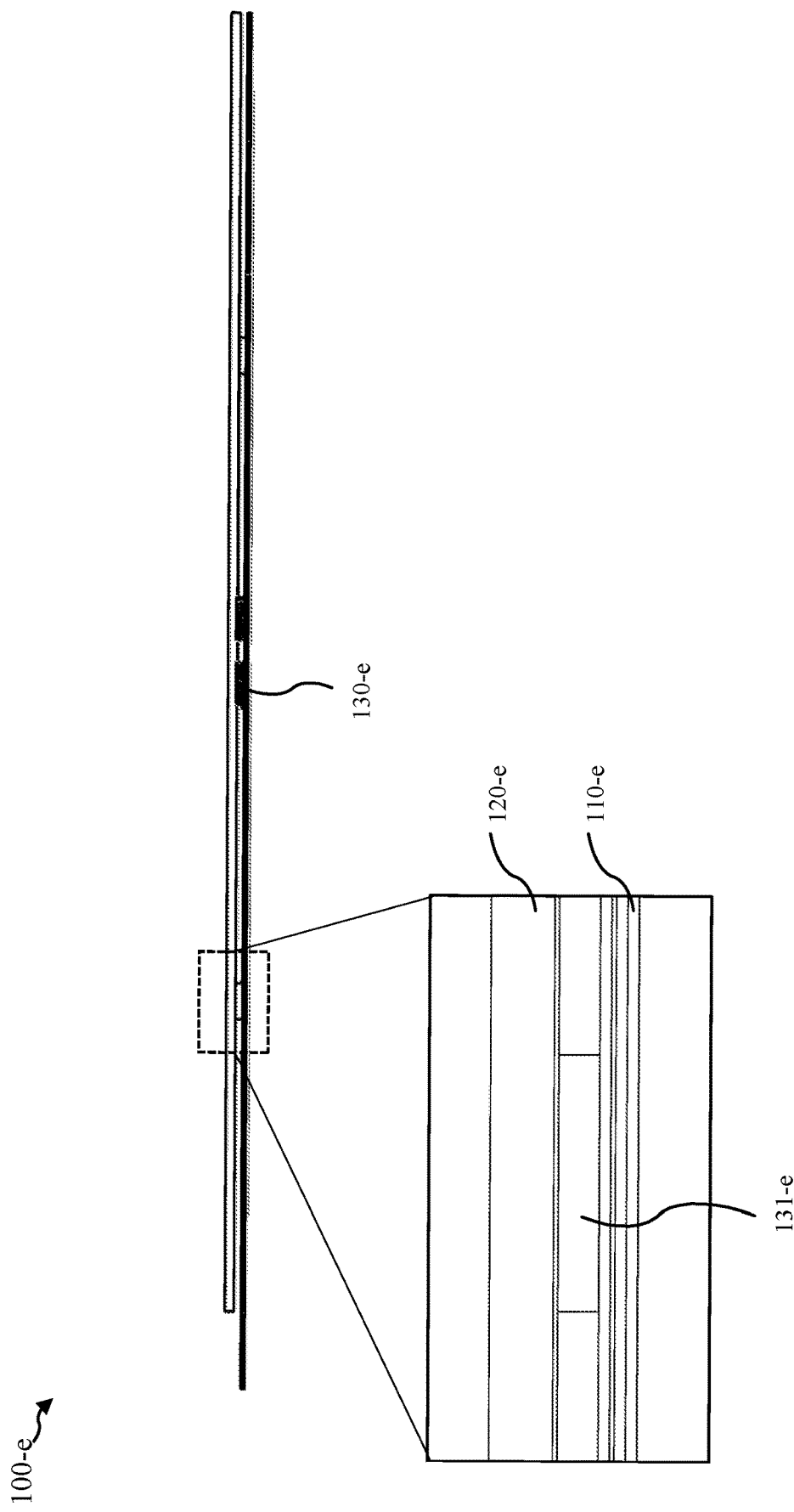
FIG. 4F shows a device and/or system in accordance with various embodiments.

FIG. 4F shows a side view with a highlighted portion of device 100-*e* in accordance with various embodiments. Device 100-*e* may be an example of device 100-*d*, for example. FIG. 4F may include one or more solar cells 110-*e* and one or more rechargeable energy storage cells 120-*e* that may be coupled with each other utilizing one or more circuits 130-*e*; the one or more circuits 130-*e* may be utilized to control the charging of the one or more rechargeable energy storage cells 120-*e*. Device 100-*e* may also include one or more thermal control circuits 131-*e*, which may be referred to as thermal switches and/or standoff components. The thermal control circuit(s) 131-*e* may be configured such that the one or more rechargeable energy storage cells 120-*e* are thermally coupled with the one or more solar cells 110-*e*. The one or more rechargeable energy storage cells 120-*e* may be thermally coupled with the one or more solar cells 110-*e* through the thermal control circuit(s) 131-*e*. The thermal control circuit(s) 131-*e* that may couple the one or more solar cells 110-*e* with the one or more rechargeable energy storage cells 120-*e* may include a unidirectional circuit such that heat may be conducted from the one or more solar cells 110-*e* to the one or more rechargeable energy storage cells 120-*e*. For example, the thermal control circuit(s) 131-*e* may act as a switch such that heat may pass from the one or more solar cells 110-*e* to the one or more rechargeable energy storage cells 120-*e* when under solar exposure, but may switch off during eclipse which may help preserve heat in the one or more rechargeable energy storage cells 120-*e* rather than heat draining back to the one or more solar cells 110-*e*.

FIG. 4G, FIG. 4H, FIG. 4I, and FIG. 4J provide examples of thermal control circuits 131-*e*-1, 131-*e*-2, 131-*e*-3, and 131-*e*-4, respectively, in accordance with various embodiments. For example, FIG. 4G may provide a thermal control circuit 131-*e*-1 that may utilize a phase change material. As the phase change material 401 undergoes a phase change and increases in volume as it is heated, one or more thermal contacts 402-*a*, 402-*b* of the thermal control circuit may move towards each other, completing a thermal circuit that may allow heat to pass from the one or more solar cells to the one or more rechargeable energy storage cells. When the phase change material cools, the thermal circuit may be switched off as the contacts are separated. FIG. 4H shows another example of a thermal control circuit 131-*e*-2 where a bi-metallic strip 403 may be utilized that may bend when it is heated, pushing a thermal contract 402-*d* to contact another thermal contact 402-*c* to complete a thermal circuit that may allow heat to pass from the one or more solar cells to the one or more rechargeable energy storage cells. When the bi-metallic strip 403 is cooled, the thermal circuit may be switched off as the contacts 402-*d*, 402-*c* are separated. The thermal control circuits of FIG. 4G and FIG. 4H may be referred to as passive thermal control circuits. FIG. 4I shows another example of thermal control circuit 131-*e*-3 that may be configured as a thermoelectric switch utilizing one or more P-N junctions 405. When a current or voltage may be applied to the one or more junctions, a thermal gradient may be established with respect to the thermal contacts 402-*e* and 402-*f* of the thermal control circuit such that heat may pass from the one or more solar cells to the one or more rechargeable energy storage cells. This thermoelectric switch may be referred to as an active switch. Another example of an active switch 131-*e*-4 may be provided in FIG. 4J that may utilize a piezo-electric switch. When a current or voltage is applied, a piezoelectric diaphragm 407 may complete the thermal control circuit from thermal contact 402-*g* to thermal contact 402-*h* such that heat may pass from the one or more solar cells to the one or more rechargeable energy storage cells. In some embodiments, the thermal control circuits 131-*e*-1, 131-*e*-2, 131-*e*-3, and 131-*e*-4 may provide unidirectional circuits between other heat sources, such as heat sources on a spacecraft, and one or more rechargeable energy storage cells.

Figure 5A:
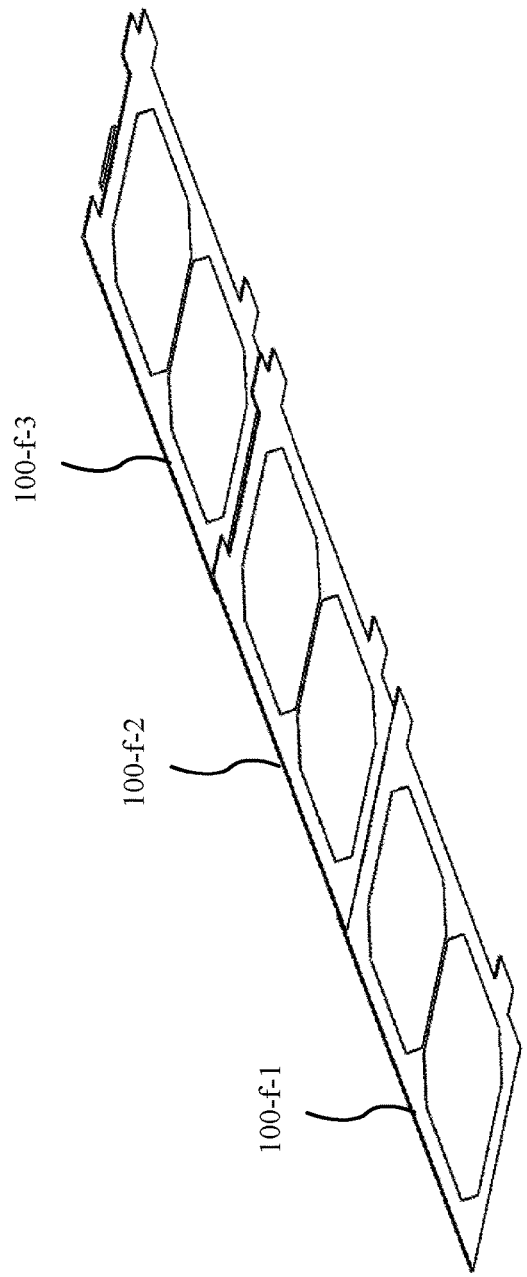
FIG. 5A shows a device and/or system in accordance with various embodiments.
Figure 5B:
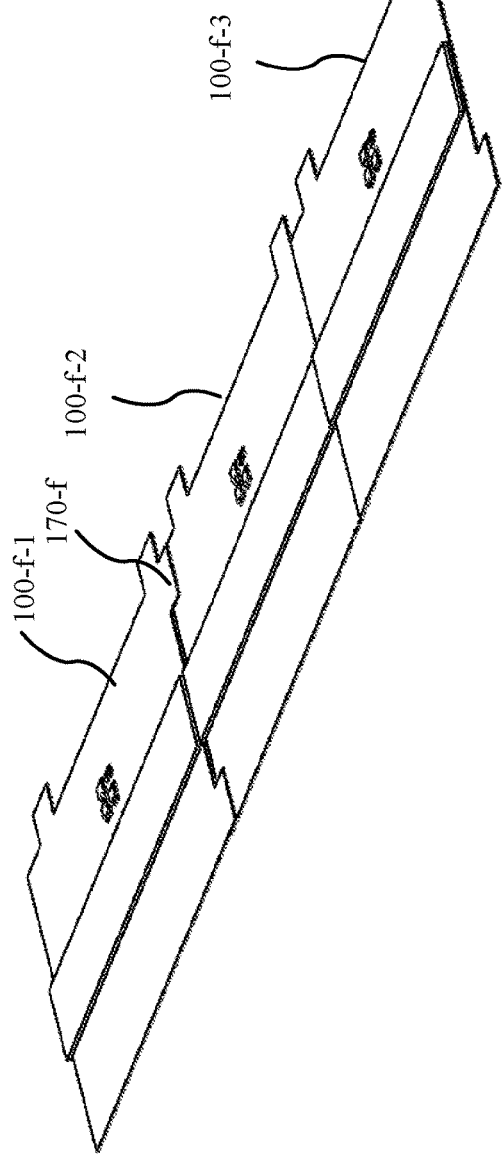
FIG. 5B shows a device and/or system in accordance with various embodiments.

Turning now to FIG. 5A and FIG. 5B, two perspectives of a system 500 in accordance with various embodiments are shown. System 500 may be an example of system 200 of FIG. 2A. FIG. 5A shows a top perspective of system 500 that includes multiple integrated power modules 100-*f*-1, 100-*f*-2, 100-*f*-3. While system 500 may show three integrated power modules 100-*f*-1, 100-*f*-2, 100-*f*-3, some embodiments may include more or fewer modules. Integrated power modules 100-*f*-1, 100-*f*-2, 100-*f*-3 may be coupled with each other in series to form a series module. One or more interconnectors 170-ƒ of each integrated power module may be utilized to couple the integrated power modules with each other. Integrated power modules 100-ƒ-1, 100-ƒ-2, 100-ƒ-3 may be examples of devices 100 of FIG. 1A, FIG. 1B, FIG. 1C, FIG. 2A, FIG. 2B, FIG. 2C, FIG. 2D, FIG. 3A, FIG. 3B, FIG. 3C, FIG. 3D, FIG. 4A, FIG. 4B, FIG. 4C, FIG. 4D, FIG. 4E, and/or FIG. 4F. Each integrated power module 100-ƒ-1, 100-ƒ-2, 100-ƒ-3 may include one or more solar cells coupled with one or more rechargeable energy storage cells utilizing one or more circuits, though these elements may not specifically be called out. The number of integrated power modules 100-ƒ-1, 100-ƒ-2, 100-ƒ-3 may be configured to be at least voltage matched or power matched across one or more ranges of load requirements with respect to one or more loads. In some embodiments, integrated power modules 100-ƒ-1, 100-ƒ-2, 100-ƒ-3 may automatically be balanced towards the end of a charge. For example, leading integrated power module 100-ƒ-1 may become fully charged first and stop charging. The leading integrated power module 100-ƒ-1 may immediately discharge in some situations and the charge may be toggled. Each successive integrated power modules 100-ƒ-2, 100-ƒ-3 may catch up and toggle prior to a next period of darkness.

FIG. 5C and FIG. 5D may then show a top perspective and a bottom perspective, respectively, of a system 501 in accordance with various embodiments. System 501 may include multiple sets of multiple integrated power modules 100-ƒ-1, 100-ƒ-2, 100-ƒ-3, 100-ƒ-4, 100-ƒ-5, 100-ƒ-6 that may be coupled in series and/or in parallel with each other to form multiple series modules. For example, integrated power modules 100-ƒ-1, 100-ƒ-2, 100-ƒ-3 may be coupled with each other in series to form a first series module; integrated power modules 100-ƒ-4, 100-ƒ-5, 100-ƒ-6 may be coupled with each other in series to form a second series module; the first series module and the second series module may then be coupled with each other in parallel. One or more interconnectors 170-ƒ of each integrated power module may be utilized to couple the integrated power modules with each other. The number and/or configuration of series modules and/or parallel modules of integrated power modules 100-ƒ-1, 100-ƒ-2, 100-ƒ-3, 100-ƒ-4, 100-ƒ-5, 100-ƒ may be configured to be at least voltage matched or power matched across one or more ranges of load requirements with respect to one or more loads. Each integrated power module 100-ƒ-1, 100-ƒ-2, 100-ƒ-3, 100-ƒ-4, 100-ƒ-5, 100-ƒ may include one or more solar cells coupled with one or more rechargeable energy storage cells utilizing one or more circuits, though these elements may not specifically be called out.

Figure 6:
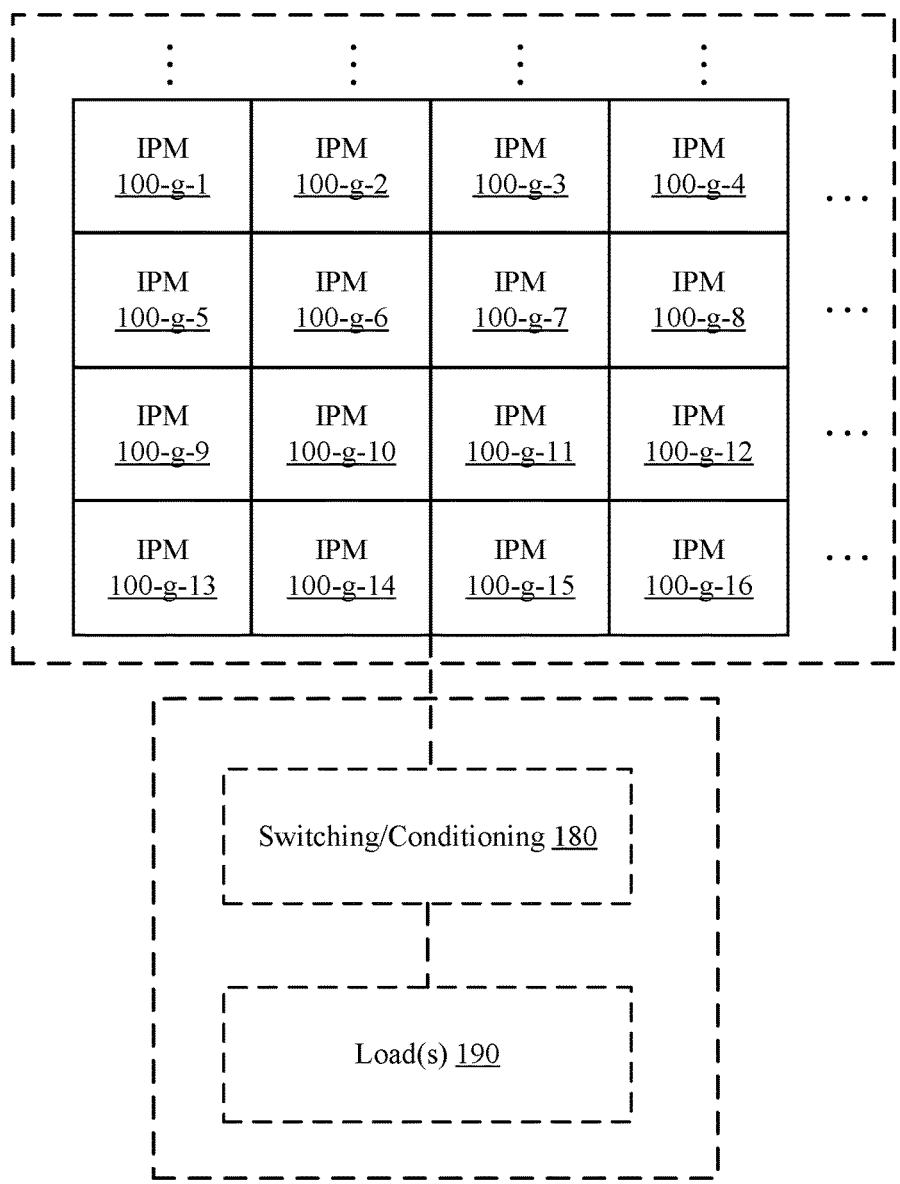
FIG. 6 shows a device and/or system in accordance with various embodiments.

FIG. 6 shows a system 600 in accordance with various embodiments. System 600 may include multiple integrated power modules (IPMs) 100-g. While 16 integrated modules 100-g may be shown, some embodiments may include more or fewer modules 100-g. The multiple integrated power modules 100-g may be coupled with each other in groups in series and/or in parallel. For example, IPMs 100-g-1, 100-g-2, 100-g-3, 100-g-4 may be coupled in series to form a series module. Similarly, IPMs 100-g-5, 100-g-6, 100-g-7, 100-g-8 may be coupled in series to form another series module; IPMs 100-g-9, 100-g-10, 100-g-11 100-g-12 may be coupled in series to form a series module; IPMs 100-g-13, 100-g-14, 100-g-15 100-g-16 may be coupled in series to form a series module. These multiple series modules may then be coupled in parallel to form a parallel module. Another configuration may include IPMs 100-g-1, 100-g-5, 100-g-9, and 100-g-13 that may be coupled in parallel to form a parallel module; IPMs 100-g-2, 100-g-6, 100-g-10, and 100-g-14 that may be coupled in parallel to form another parallel module; IPMs 100-g-3, 100-g-7, 100-g-11, and 100-g-115 that may be coupled in parallel to form another parallel module; IPMs 100-g-4, 100-g-8, 100-g-12, and 100-g-16 that may be coupled in parallel to form another parallel module. These multiple parallel modules may then be coupled in series to form a parallel module. The multiple integrated power modules 100-g may be examples of devices 100 of FIG. 1A, FIG. 1B, FIG. 1C, FIG. 2A, FIG. 2B, FIG. 2C, FIG. 2D, FIG. 3A, FIG. 3B, FIG. 3C, FIG. 3D, FIG. 4A, FIG. 4B, FIG. 4C, FIG. 4D, FIG. 4E, FIG. 4F, FIG. 5A, FIG. 5B, FIG. 5C, and/or FIG. 5D. The multiple integrated power modules 100-g may be coupled with one or more loads 190. The configuration of integrated power modules 100-g may be set through coupling the modules in parallel and/or in series to voltage match and/or power match across one or more ranges of load requirements with respect to the one or more loads 190. Some embodiments may include switching and/or conditioning components 180 positioned between the multiple integrated power modules 100-g and the one or more loads 190.

Figure 7A:
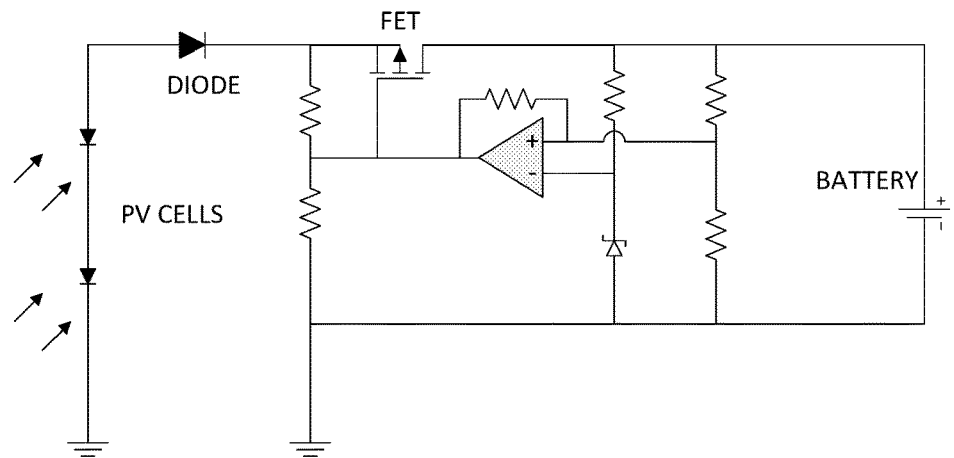
FIG. 7A shows a device and/or system in accordance with various embodiments.
Figure 7B:
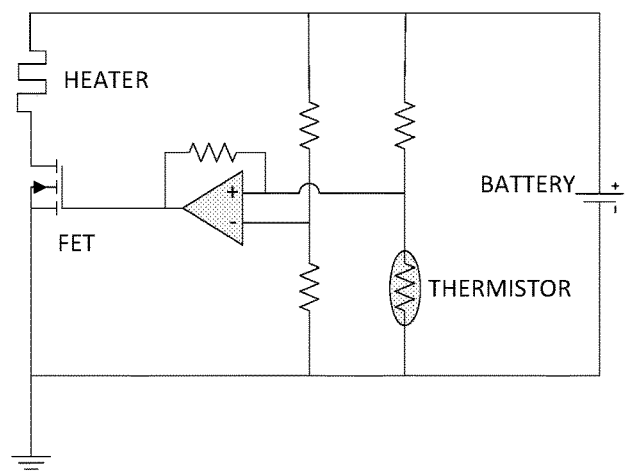
FIG. 7B shows a device and/or system in accordance with various embodiments.

Turning now to FIG. 7A and FIG. 7B, two electrical schematics 701 and 702, respectively, are shown in accordance with various embodiments. Electrical schematic 701 may provide an example of aspects of device 100 of FIG. 1A, FIG. 1B, FIG. 1C, FIG. 2B, FIG. 2C, FIG. 2D, FIG. 3A, FIG. 3B, FIG. 3C, FIG. 3D, FIG. 4A, FIG. 4B, FIG. 4C, FIG. 4D, FIG. 4E, FIG. 4F, FIG. 5A, FIG. 5B, FIG. 5C, FIG. 5D, and/or FIG. 6. For example, electrical schematic 701 may provide for battery charge regulation of one or more batteries or other rechargeable energy storage cells from energy provided by one or more photovoltaic cells. Other components may be shown, such as solar cells and rechargeable energy storage cells. Electrical schematic 701 may provide an example of a direct energy transfer architecture. Merely by way of example, electrical schematic 701 may be configured to control a rechargeable energy storage cell, such as an ASSB, less than its recommended End of Charge Voltage (EOCV). Electrical schematic 702 may provide an example of aspects of device 100 of FIG. 1A, FIG. 1B, FIG. 1C, FIG. 2B, FIG. 2C, FIG. 2D, FIG. 3A, FIG. 3B, FIG. 3C, FIG. 3D, FIG. 5A, FIG. 5B, FIG. 5C, FIG. 5D, and/or FIG. 6. For example, electrical schematic 702 may provide for a battery heater circuit. Electrical schematic 702 may provide a thermostat control for a rechargeable energy storage device. The heater may be directly powered by the one or more rechargeable energy storage devices. Merely by way of example, electrical schematic 702 may be sized for up to a 2 W heater.

Figure 8:
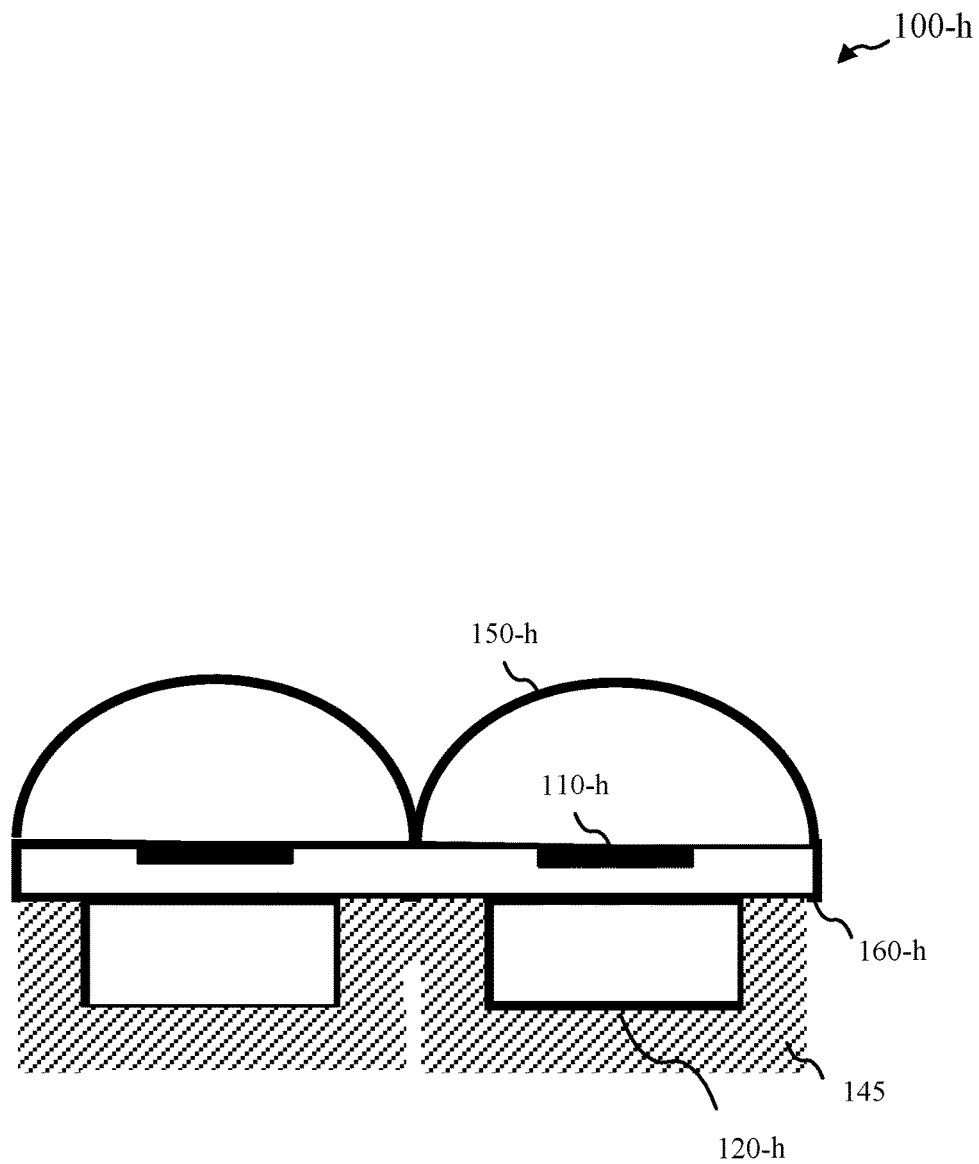
FIG. 8 shows a device and/or system in accordance with various embodiments.

Turning now to FIG. 8, a device 100-h is provided in accordance with various embodiments. Device 100-h may be an example of integrated power module. Device 100-h may be an example of device 100 of FIG. 1A, FIG. 1B, FIG. 1C, FIG. 2A, FIG. 2B, FIG. 2C, FIG. 2D, FIG. 3A, FIG. 3B, FIG. 3C, FIG. 3D, FIG. 4A, FIG. 4B, FIG. 4C, FIG. 4D, FIG. 4E, FIG. 4F, FIG. 5A, FIG. 5B, FIG. 5C, FIG. 5D, and/or FIG. 6.

Device 100-h may include one or more rechargeable energy storage cells 120-h coupled with one or more solar cells 110-h; one or more substrates 160-h may couple these components with each other that may include traces (not shown) and/or circuits (not shown) to provide this coupling. Device 100-h may also include one or more thermal management components 145; for example, thermal management component(s) 145 may include insulation with respect to the one or more rechargeable energy storage cells 120-h. In some embodiments, the thermal management component(s) 145 may include one or more optical coatings to help reduce the loss of heat from the one or more rechargeable energy storage cells 120-*h*. In some embodiments, the thermal management component(s) 145 may include one or more heaters.

Device 100-*h* may also include one or more concentrators 150-*h*. The one or more concentrators 150-*h* may be configured to increase an effective collection area and/or a conversion efficiency of the one or more solar cells 110-*h*. The one or more concentrators 150-*h* may include one or more lenses, as may be shown in FIG. 8; some embodiments may utilize other concentrators, including, but not limited to, parabolic reflectors.

Figure 9A:
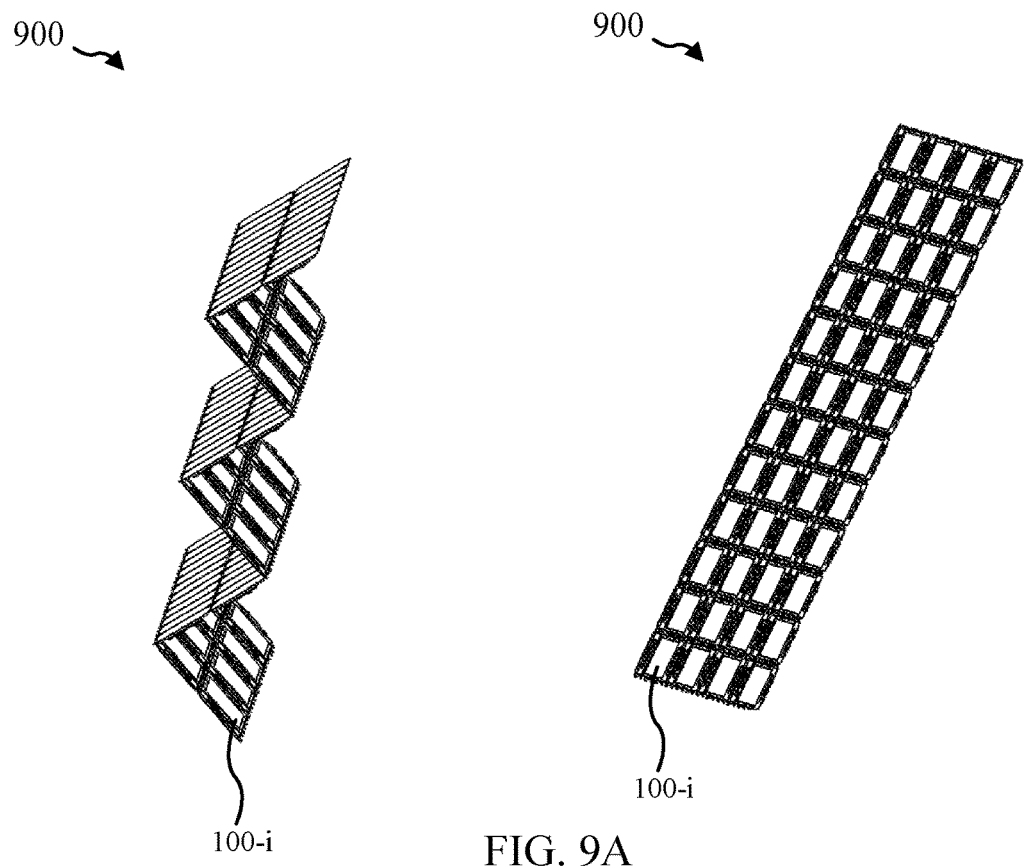
FIG. 9A shows a device and/or system in accordance with various embodiments.
Figure 9B:
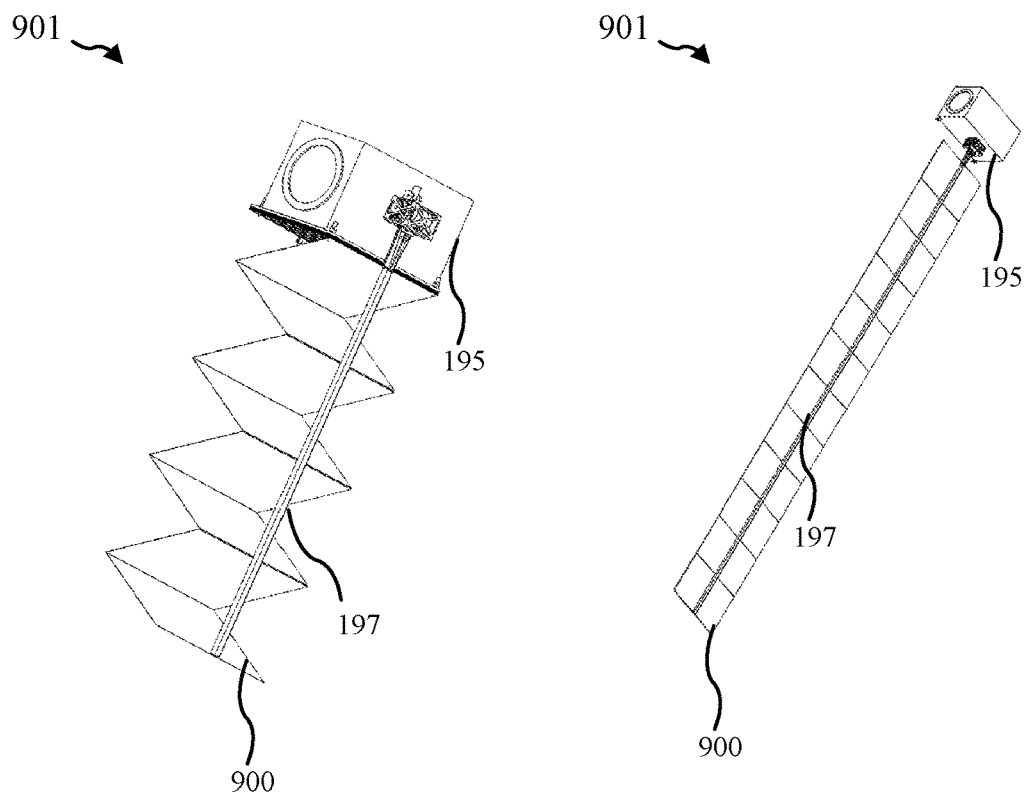
FIG. 9B shows a device and/or system in accordance with various embodiments.
Figure 9C:
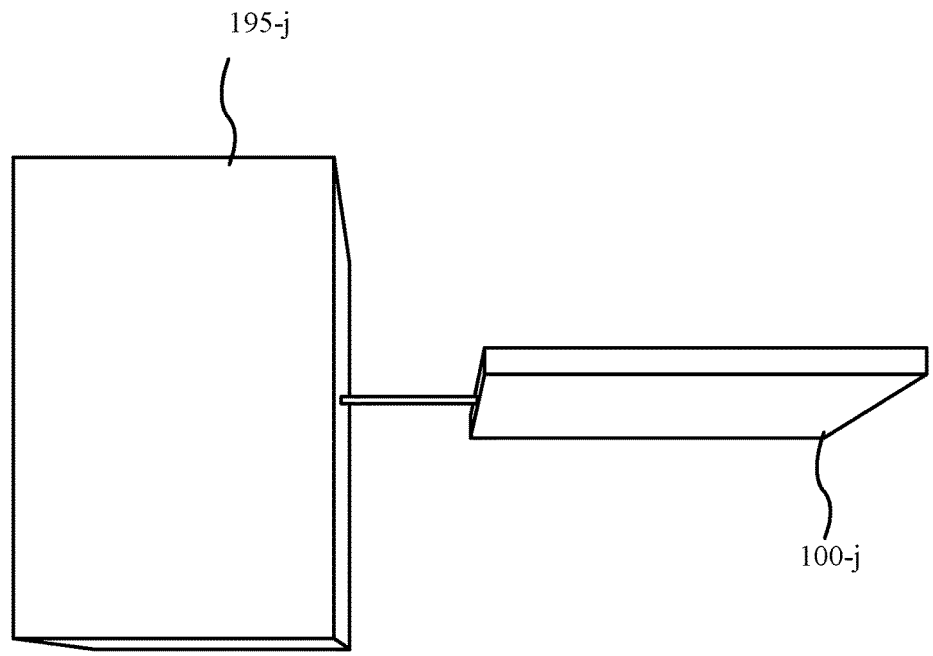
FIG. 9C shows a device and/or system in accordance with various embodiments.

Turning now to FIG. 9A, two stages of deployment of a system 900 are shown in accordance with various embodiments. System 900 may include multiple integrated power modules (with one module 100-*i* specifically called out) coupled with each other to form a Z-fold wing. The multiple integrated power modules may be coupled with each other in a variety of configurations such that groups of modules may be coupled in series and/or parallel. The left image shows system 900 partially deployed, while the right image shows the system 900 fully deployed, showing the bottom sides of multiple integrated power modules that may include one or more rechargeable energy storage cells. System 900 may be an example of system 200 of FIG. 2A, system 500 of FIG. 5A and/or FIG. 5B, and/or system 501 of FIG. 5C and/or FIG. 5D with multiple integrated power modules such as device 100 of device 100 of FIG. 1A, FIG. 1B, FIG. 1C, FIG. 2A, FIG. 2B, FIG. 2C, FIG. 2D, FIG. 3A, FIG. 3B, FIG. 3C, FIG. 3D, FIG. 4A, FIG. 4B, FIG. 4C, FIG. 4D, FIG. 4E, FIG. 4F, FIG. 5A, FIG. 5B, FIG. 5C, FIG. 5D, FIG. 6, and/or FIG. 8. FIG. 9B shows system 900 as part of a large system 901 that may include a spacecraft 195 that may include one or more loads and a deployable boom 197. The deployable boom 197 may include a variety of boom architectures such as a slit tube boom that may be formed from a high-strain composite. The left image may show the system 901 in partial deployment, while the right image may show the system 901 in full deployment. The multiple integrated power modules of system 900 and/or 901 may be at least voltage matched or power matched across one or more ranges of load requirements with respect to one or more loads that may part of spacecraft 195.

Figure 9D:
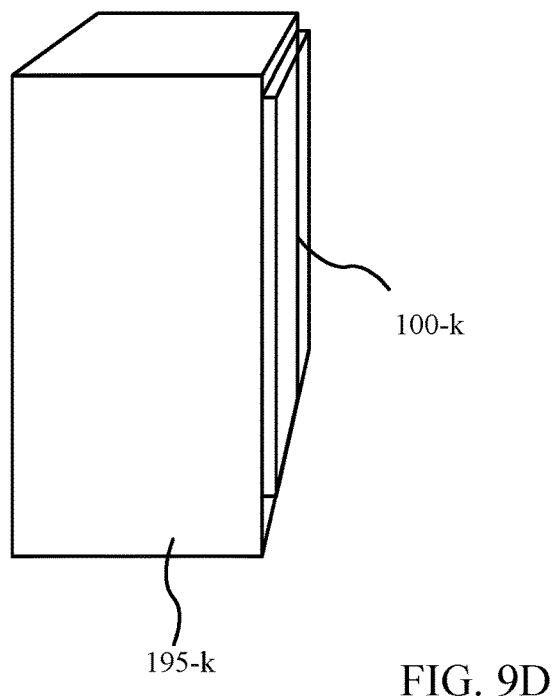
FIG. 9D shows a device and/or system in accordance with various embodiments.
Figure 9E:
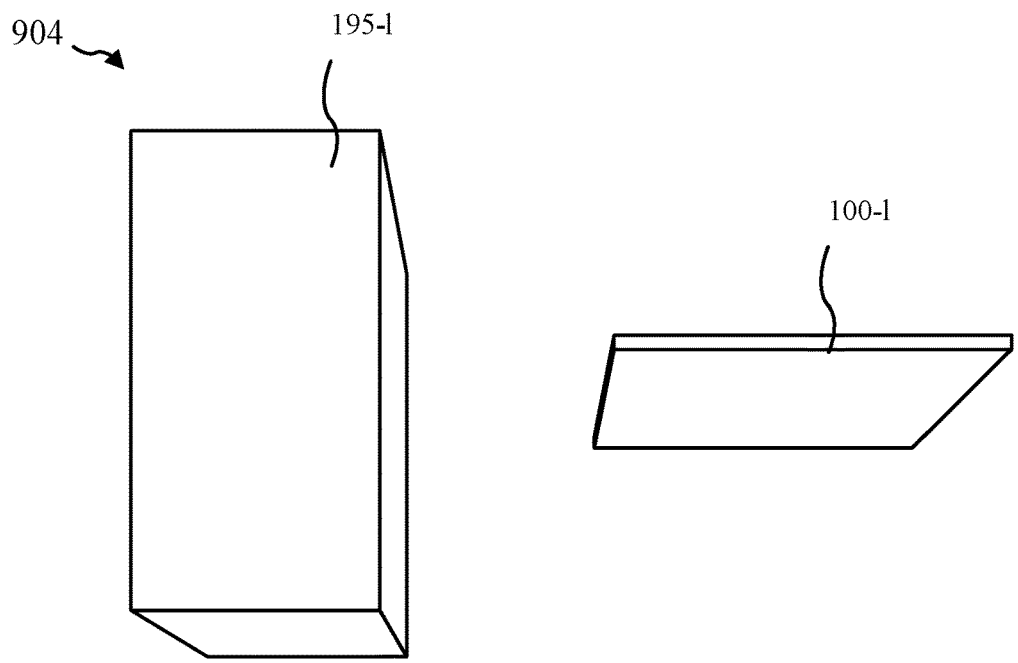
FIG. 9E shows a device and/or system in accordance with various embodiments.
Figure 9F:
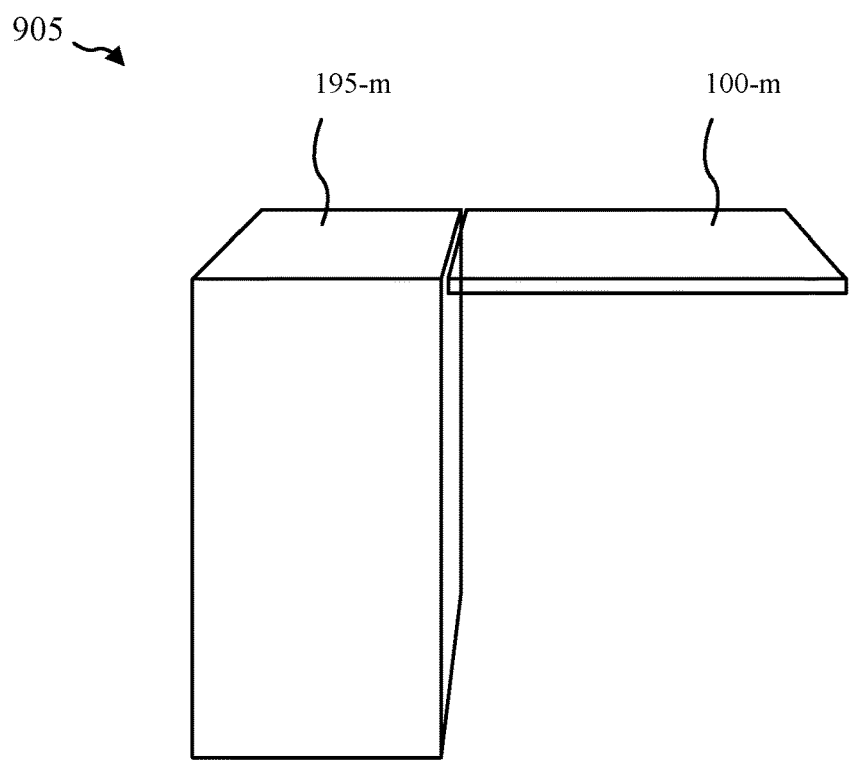
FIG. 9F shows a device and/or system in accordance with various embodiments.

FIG. 9C, FIG. 9D, FIG. 9E, and FIG. 9F show other examples of system configurations in accordance with various embodiments that may include one or more integrated power modules coupled with each other with respect to a spacecraft or other component that may include one or more loads. For example, FIG. 9C may show a system 902 with the one or more integrated power modules 100-*j* extended as a flat wing structure from a spacecraft 195-*j*. FIG. 9D may show an example of a system 903 where the one or more integrated power modules 100-*k* may be coupled with a side of a spacecraft 195-*k*. FIG. 9E shows an example of a system 904 where the one or more integrated power modules 100-*l* may be physically separated from the spacecraft 195-*l* but may be able to wirelessly transmit power to the one or more spacecrafts 195-*l*. FIG. 9F may show an example of a system 905 where the one or more integrated power modules 100-*m* may be extended from a side or edge of the spacecraft 195-*m*; in some embodiments, the one or more integrated power modules 100-*m* may be configured to fold out from the spacecraft 195-*m* to form this configuration. In general, the one or more integrated power modules of FIG. 9A-9F may be configured to provide power to one or more loads of the spacecraft 195. The one or more integrated power modules 100-*i*, 100-*j*, 100-*k*, 100-*l*, 100-*m* may be thermally isolated from the respective spacecraft 195, 195-*j*, 195-*k*, 195-*l*, 195-*m* either through distance and/or isolation components. In some embodiments, the one or more integrated power modules 100-*i*, 100-*j*, 100-*k*, 100-*m* are thermally coupled with one or more heat sources on the respective spacecrafts 195, 195-*j*, 195-*k*, 195-*m* such that heat passes from one or more heat sources on the spacecraft 195, 195-*j*, 195-*k*, 195-*m* to the one or more rechargeable energy storage cells of the one or more integrated power modules 100-*i*, 100-*j*, 100-*k*, 100-*m*, such as through a thermal control circuit. The one or more power modules 100 may be examples of devices 100 of device 100 of FIG. 1A, FIG. 1B, FIG. 1C, FIG. 2A, FIG. 2B, FIG. 2C, FIG. 2D, FIG. 3A, FIG. 3B, FIG. 3C, FIG. 3D, FIG. 4A, FIG. 4B, FIG. 4C, FIG. 4D, FIG. 4E, FIG. 4F, FIG. 5A, FIG. 5B, FIG. 5C, FIG. 5D, FIG. 6, and/or FIG. 8.

Figure 10A:
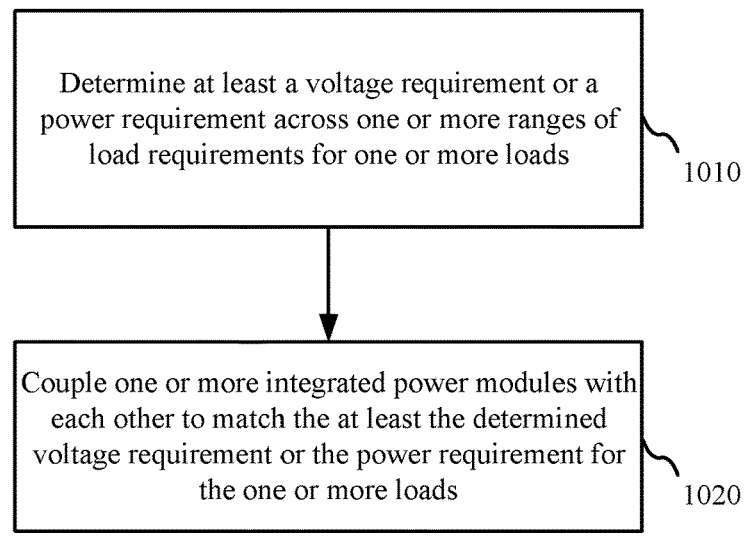
FIG. 10A shows a flow diagram of a method in accordance with various embodiments.

Turning now to FIG. 10A, a flow diagram of a method 1000 is shown in accordance with various embodiments. Method 1000 may be implemented utilizing a variety of systems and/or devices such as those shown and/or described with respect to FIG. 1A, FIG. 1B, FIG. 1C, FIG. 2A, FIG. 2B, FIG. 2C, FIG. 2D, FIG. 3A, FIG. 3B, FIG. 3C, FIG. 3D, FIG. 4A, FIG. 4B, FIG. 4C, FIG. 4D, FIG. 4E, FIG. 4F, FIG. 5A, FIG. 5B, FIG. 5C, FIG. 5D, FIG. 6, FIG. 7A, FIG. 7B, FIG. 8, FIG. 9A, FIG. 9B, FIG. 9C, FIG. 9D, FIG. 9E, and/or FIG. 9F.

At block 1010, at least a voltage requirement or a power requirement may be determined across one or more ranges of load requirements for one or more loads. At block 1020, one or more integrated power modules may be coupled with each other to match the at least the determined voltage requirement or the power requirement for the one or more loads. The one or more integrated power modules may include: one or more solar cells; one or more rechargeable energy storage cells; and/or one or more circuits coupling the one or more solar cells with the one or more rechargeable energy storage cells. In some embodiments, each integrated power module is configured such that the one or more rechargeable energy storage cells of the respective integrated power module are coupled with one or more back sides of the one or more solar cells. In some embodiments, at least two of the one or more integrated power modules are coupled with each other at least in parallel or in series.

Turning now to FIG. 10B, a flow diagram of a method 1001 is shown in accordance with various embodiments. Method 1001 may be implemented utilizing a variety of systems and/or devices such as those shown and/or described with respect to FIG. 1A, FIG. 1B, FIG. 1C, FIG. 2A, FIG. 2B, FIG. 2C, FIG. 2D, FIG. 3A, FIG. 3B, FIG. 3C, FIG. 3D, FIG. 4A, FIG. 4B, FIG. 4C, FIG. 4D, FIG. 4E, FIG. 4F, FIG. 5A, FIG. 5B, FIG. 5C, FIG. 5D, FIG. 6, FIG. 7A, FIG. 7B, FIG. 8, FIG. 9A, FIG. 9B, FIG. 9C, FIG. 9D, FIG. 9E, and/or FIG. 9F.

At block 1030, one or more rechargeable energy storage cells may be heated, where the one or more rechargeable energy storage cells may be coupled with one or more solar cells as an integrated power module. Heating the one or more rechargeable energy storage cells may utilize one or more heaters coupled with the one or more rechargeable energy storage cells. Heating the one or more rechargeable energy storage cells may utilize heat from the one or more solar cells. Heating the one or more rechargeable energy storage cells utilizing the heat from the one or more solar cells may include utilizing a unidirectional circuit such that heat is conducted from the one or more solar cells to the one or more rechargeable energy storage cells. In some embodiments, heating the one or more rechargeable energy storage cells utilizing the heat from the one or more solar cells may include utilizing one or more spacers positioned between the one or more solar cells and the one or more rechargeable energy storage cells. Heating the one or more rechargeable energy storage cells may utilize at least a charging or a discharging of the one or more rechargeable energy storage cells. In some embodiments, heating the one or more rechargeable energy storage cells may utilize heat from one or more heat sources on a spacecraft; this heating may utilize a unidirectional circuit such that the heat from the one or more heat sources on the spacecraft is conducted from the one or more heat sources on the spacecraft to the one or more rechargeable energy storage cells.

These embodiments may not capture the full extent of combination and permutations of materials and process equipment. However, they may demonstrate the range of applicability of the method, devices, and/or systems. The different embodiments may utilize more or fewer stages than those described.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various stages may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the embodiments.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail to avoid obscuring the embodiments.

Also, it is noted that the embodiments may be described as a process which may be depicted as a flow diagram or block diagram or as stages. Although each may describe the operations as a sequential process, many of the operations can be performed in parallel or concurrently. In addition, the order of the operations may be rearranged. A process may have additional stages not included in the figure.

Having described several embodiments, it will be recognized by those of skill in the art that various modifications, alternative constructions, and equivalents may be used without departing from the spirit of the different embodiments. For example, the above elements may merely be a component of a larger system, wherein other rules may take precedence over or otherwise modify the application of the different embodiments. Also, several stages may be undertaken before, during, or after the above elements are considered. Accordingly, the above description should not be taken as limiting the scope of the different embodiments.

What is claimed is:

1. A system comprising:
one or more integrated power modules, wherein each integrated power module includes:
one or more solar cells;
one or more rechargeable energy storage cells coupled to the one or more solar cells;
wherein one or more circuits couples the one or more solar cells with the one or more rechargeable energy storage cells, and wherein
at least one of the one or more circuits coupling the one or more solar cells to the one or more rechargeable energy storage cells includes one or more thermal control circuits configured to conduct heat from the one or more solar cells to the one or more rechargeable energy storage cells and to avoid losing heat through heat conducting back to the one or more solar cells.

2. The system of claim 1, wherein each integrated power module is configured such that the one or more rechargeable energy storage cells of the respective integrated power module are coupled with one or more back sides of the one or more solar cells.

3. The system of claim 2, wherein at least two of the one or more integrated power modules are coupled with each other at least in parallel to form one or more parallel modules or in series to form one or more series modules.

4. The system of claim 3, wherein at least two of the one or more parallel modules are coupled in series or two or more of the one or more series modules are coupled in parallel.

5. The system of claim 1, wherein each integrated power module further includes one or more electrical interconnectors configured to couple each respective integrated power module with at least one other integrated power module at least in parallel or in series.

6. The system of claim 1, wherein the one or more circuits are configured to control the charging of one or more rechargeable energy storage cells.

7. The system of claim 1, further comprising one or more heaters coupled with the one or more rechargeable energy storage cells.

8. The system of claim 1, wherein the one or more rechargeable energy storage cells include one or more rechargeable batteries.

9. The system of claim 8, wherein the one or more rechargeable batteries include one or more solid state batteries.

10. The system of claim 1, further comprising one or more concentrators configured to increase at least an effective collection area or a conversion efficiency of the one or more solar cells.

11. The system of claim 10, wherein the one or more concentrators includes one or more lenses.

12. The system of claim 1, wherein the one or more integrated power modules are at least voltage matched or power matched across one or more ranges of load requirements with respect to one or more loads.

13. The system of claim 1, wherein the one or more solar cells of a respective integrated power module are voltage matched with the one or more rechargeable storage cells of the respective integrated power module.

14. The system of claim 13, further comprising the one or more loads coupled with the one or more integrated power modules.

15. The system of claim 1, wherein each integrated power module includes one or more substrates configured to couple at least the one or more solar cells, the one or more rechargeable energy storage cells, or the one or more circuits with each other.

16. The system of claim 15, wherein at least one of the one or more substrates includes one or more traces configured to couple at least the one or more solar cells, the one or more rechargeable energy storage cells, the one or more circuits, one or more heaters, or two or more of the one or more integrated power modules with each other.

17. The system of claim 1, wherein the one or more integrated power modules are coupled with a spacecraft.

18. The system of claim 17, wherein the one or more integrated power modules are configured as a Z-fold wing.

19. The system of claim 18, further comprising a deployable boom coupled with the Z-fold wing.

20. The system of claim 1, wherein the one or more integrated power modules are thermally isolated from a spacecraft.

21. The system of claim 1, wherein the one or more integrated power modules are thermally coupled with one or more heat sources on a spacecraft such that heat passes from one or more heat sources on the spacecraft to the one or more rechargeable energy storage cells.

22. A method comprising:
heating one or more rechargeable energy storage cells coupled with one or more solar cells as an integrated power module, wherein heating the one or more rechargeable energy storage cells utilizes heat from the one or more solar cells that include utilizing one or more thermal control circuits configured to conduct heat from the one or more solar cells to the one or more rechargeable energy storage cells and to avoid losing heat through heat conducting back to the one or more solar cells.

23. The method of claim 22, wherein heating the one or more rechargeable energy storage cells utilizes one or more heaters coupled with the one or more rechargeable energy storage cells.

24. The method of claim 22, wherein heating the one or more rechargeable energy storage cells utilizing the heat from the one or more solar cells includes utilizing one or more spacers positioned between the one or more solar cells and the one or more rechargeable energy storage cells.

25. The method of claim 22, wherein heating the one or more rechargeable energy storage cells utilizes at least a charging or a discharging of the one or more rechargeable energy storage cells.

26. The method of claim 22, wherein heating the one or more rechargeable energy storage cells utilizes heat from one or more heat sources on a spacecraft.

* * * * *